(12) United States Patent
Kaechi

(10) Patent No.: US 7,987,364 B2
(45) Date of Patent: Jul. 26, 2011

(54) METHOD OF DETECTING AND AUTHENTICATING CONNECTION TARGET FOR WIRELESS COMMUNICATION APPARATUS

(75) Inventor: Shuya Kaechi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 853 days.

(21) Appl. No.: 10/587,856

(22) PCT Filed: Oct. 25, 2005

(86) PCT No.: PCT/JP2005/019938
§ 371 (c)(1),
(2), (4) Date: Jul. 28, 2006

(87) PCT Pub. No.: WO2006/046720
PCT Pub. Date: May 4, 2006

(65) Prior Publication Data
US 2008/0184345 A1     Jul. 31, 2008

(30) Foreign Application Priority Data
Oct. 28, 2004     (JP) .................................. 2004-314723

(51) Int. Cl.
*H04L 9/32*     (2006.01)
(52) U.S. Cl. .................. 713/169; 713/168; 380/258
(58) Field of Classification Search .................. 713/169
See application file for complete search history.

(56) References Cited

U.S. PATENT DOCUMENTS

| | | | |
|---|---|---|---|
| 5,872,917 A * | 2/1999 | Hellman | 726/6 |
| 5,930,368 A | 7/1999 | Hocker et al. | 380/52 |
| 6,088,450 A * | 7/2000 | Davis et al. | 713/182 |
| 6,304,968 B1 * | 10/2001 | Hacker et al. | 713/153 |
| 6,961,541 B2 * | 11/2005 | Overy et al. | 455/41.2 |
| 7,395,427 B2 * | 7/2008 | Walker | 713/169 |
| 2002/0016153 A1 | 2/2002 | Sato et al. | 455/41 |
| 2002/0147819 A1 | 10/2002 | Miyakoshi et al. | 709/228 |
| 2005/0102517 A1 * | 5/2005 | Paddon et al. | 713/168 |
| 2005/0201557 A1 * | 9/2005 | Ishidoshiro | 380/44 |

FOREIGN PATENT DOCUMENTS

EP     1 178 697 A2     2/2002
(Continued)

OTHER PUBLICATIONS

Office Action dated Nov. 22, 2010 in JP 2004-314723.

*Primary Examiner* — Ponnoreay Pich
(74) *Attorney, Agent, or Firm* — Fitzpatrick, Cella, Harper & Scinto

(57) ABSTRACT

This invention is directed to simplify operation to be performed by an operator and allow authentication processing between two apparatuses while each apparatus uses a single wireless communication unit. For this purpose, when an authentication start instruction button is operated, a host apparatus decreases its RF power to set a communication range to about several ten cm. The host transmits an inquiry signal containing verification data and time interval data. A device which has received this inquiry signal transmits an inquiry response signal containing verification data and information for specifying itself at instructed time intervals. The host transmits authentication information only when this inquiry response is received at the set time intervals, the inquiry response contains verification data, the reception signal intensity changes in a predetermined range, and the inquiry response is sent from one device.

18 Claims, 18 Drawing Sheets

FOREIGN PATENT DOCUMENTS

| | | |
|---|---|---|
| JP | 07-295903 | 11/1995 |
| JP | 2002-118577 | 4/2002 |
| JP | 2002-359623 | 12/2002 |
| JP | 3422683 | 6/2003 |
| JP | 2003-188886 | 7/2003 |
| JP | 2003-218733 | 7/2003 |
| JP | 2004-221851 | 8/2004 |
| WO | 2004/090781 A1 | 10/2004 |

* cited by examiner

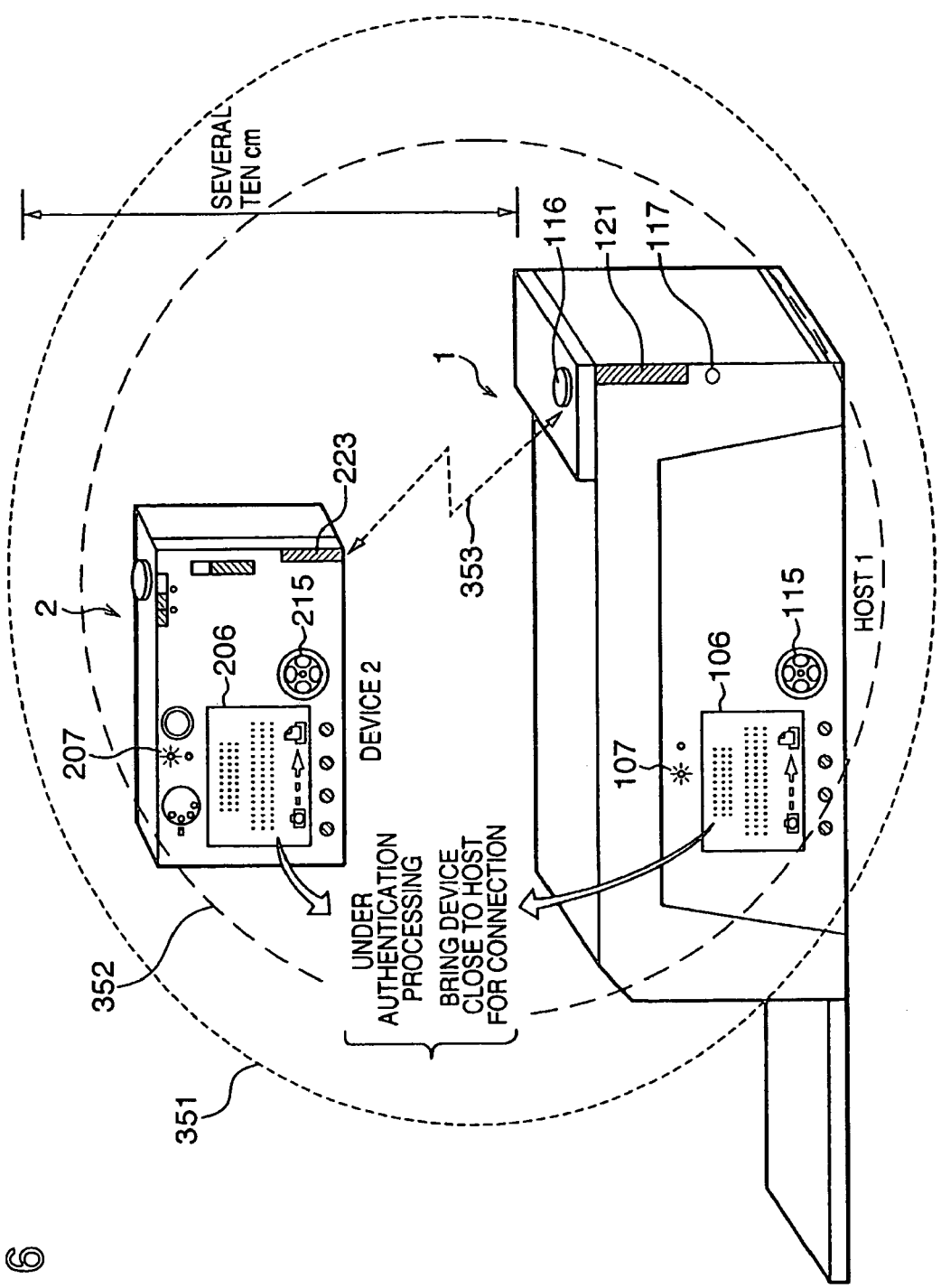

RF POWER/DISTANCE CHARACTERISTICS OF
SIGNAL RECEIVED BY HOST

RF POWER/RADIATION
CHARACTERISTICS OF DEVICE

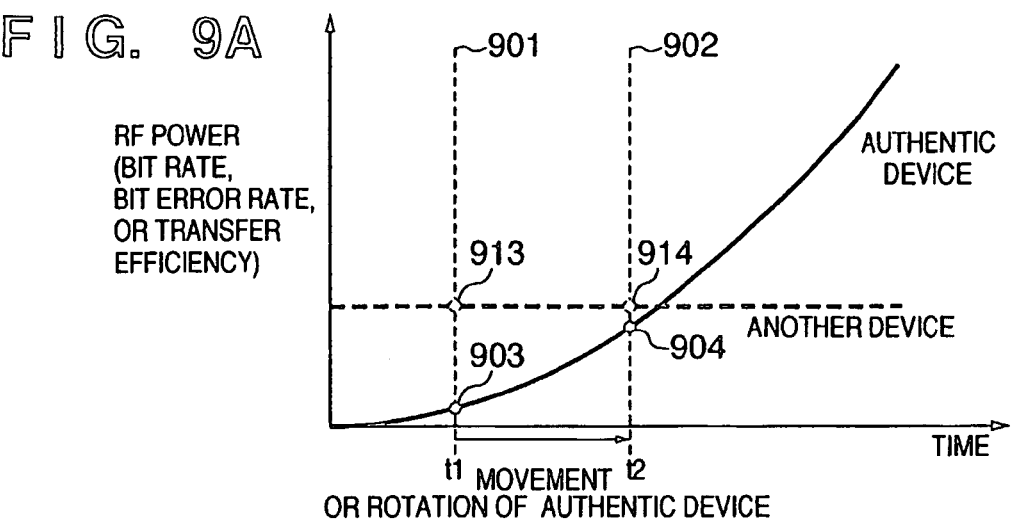
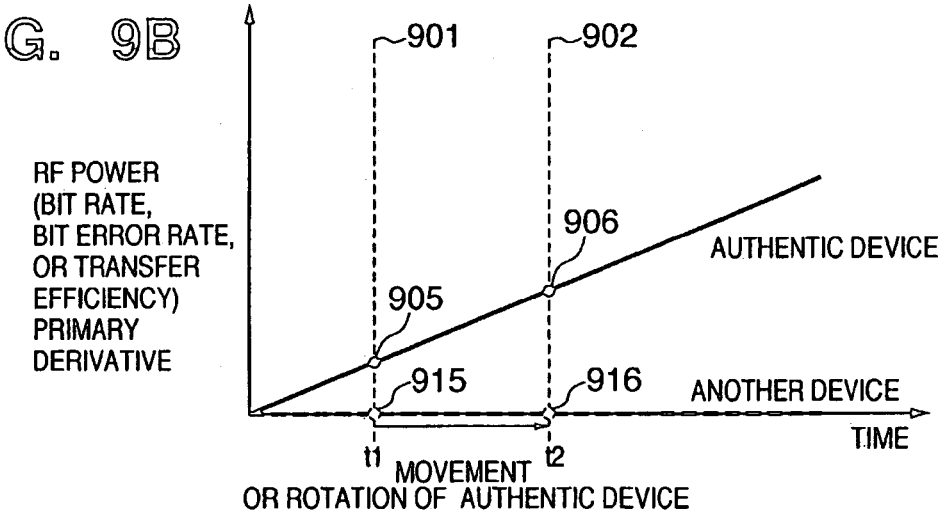
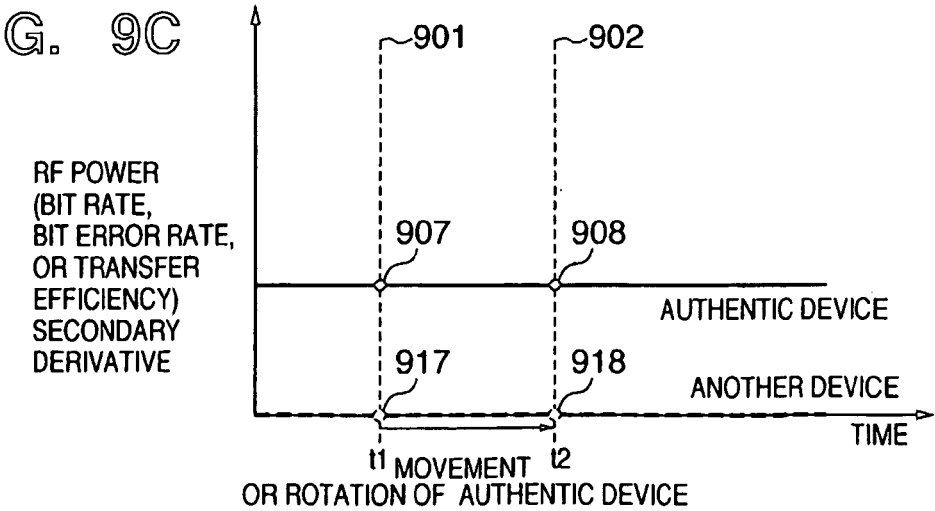

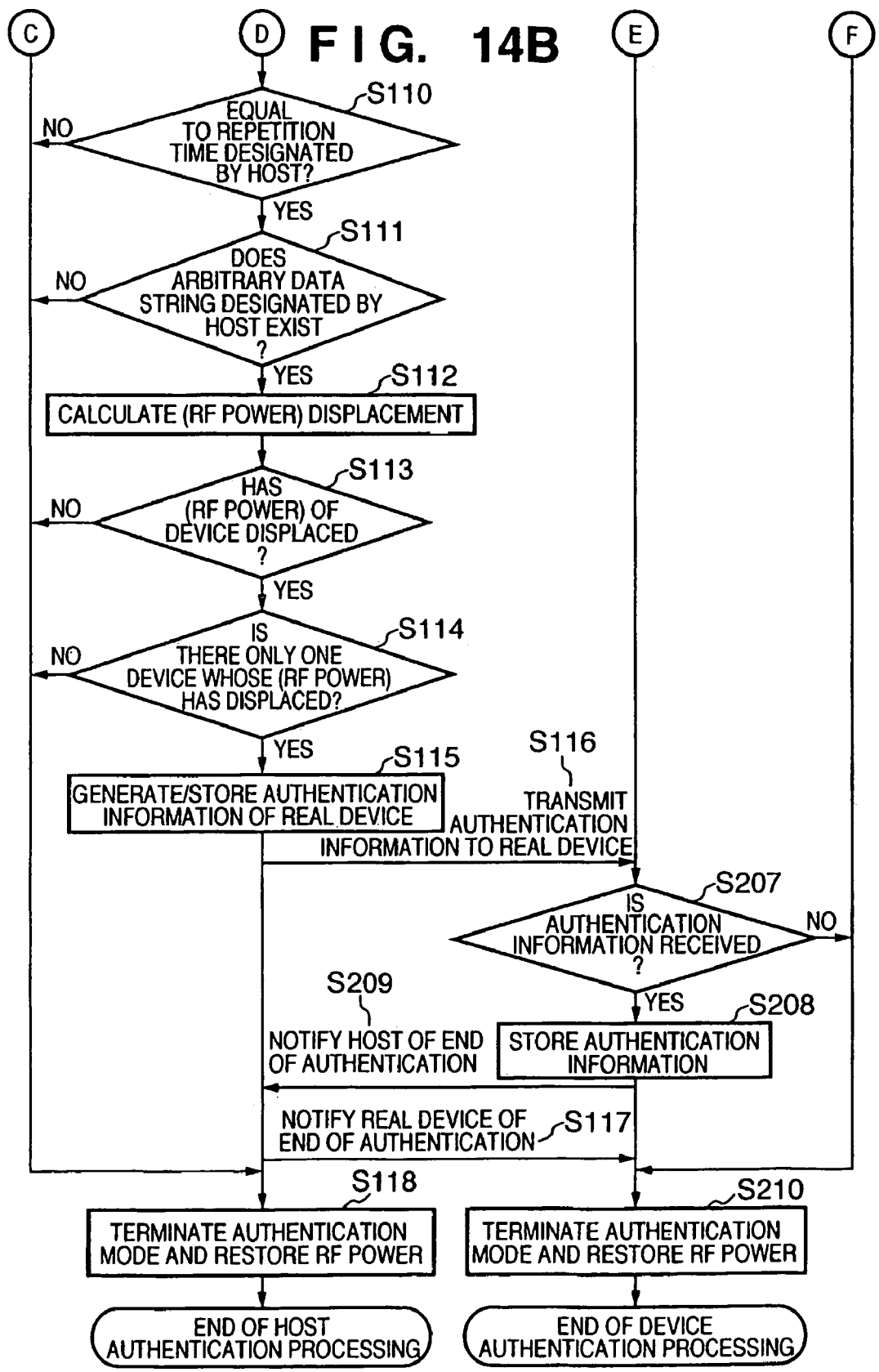

METHOD OF DETECTING AND AUTHENTICATING CONNECTION TARGET FOR WIRELESS COMMUNICATION APPARATUS

TECHNICAL FIELD

The present invention relates to a method of detecting and authenticating a connection target for a wireless communication apparatus when authentication information such as a communication parameter and address identifier is to be exchanged between wireless communication apparatuses.

BACKGROUND ART

Recently, the use of wireless communication connection has rapidly increased for data communication and control on various kinds of information devices such as information terminals, e.g., cellular-telephones and PDAs (Personal Digital Assistants), personal computers, and peripheral devices of personal computers, typified by printers. A wireless communication system based on this wireless communication connection uses not only the public switched telephone network but also a local network such as a Bluetooth® network or wireless LAN.

Wireless communication functions are being mounted in various devices, other than the above information devices, e.g., image capturing apparatuses such as digital cameras, home electric appliances, and accessories. Although USB (Universal Serial Bus) is widely used as a wired communication connection method, wireless USB is under development.

When a wireless communication apparatus is to perform wireless data communication, a procedure called authentication is executed in many cases to prevent the apparatus from being connected to an unspecified apparatus or unintended apparatus. In performing this authentication, PIN (Personal Identification Number) code, ESSID (Extended Service Set Identifier), or the like is exchanged as one piece of authentication information between wireless communication apparatuses. Using the authentication information then makes the two specific wireless communication apparatuses which have exchanged the authentication information associate with each other in a one-to-one correspondence, thereby ensuring authentication security for wireless communication.

This authentication information should not be disclosed to the third person. If the authentication information leaks to the third person, the third person may access electronic data such as a document, address book, electronic mail, personal information, and image data stored in the apparatus. There is a risk that a wireless communication system, accounting system, and print system may be fraudulently used. In such a situation, much attention has been paid to security measures for these wireless communication apparatuses.

There are available several input methods for authentication information for making wireless communication apparatuses mutually authenticate. More specifically, such methods include a method of manually inputting information, a method of inputting information by inserting a SIM (Subscriber Identify Module) card into a device, a method of performing authentication by using infrared communication, a method of performing authentication by using a connection cable, a method of causing one of two wireless communication means provided in apparatuses to perform authentication, and the like. Authentication information such as communication parameter, address identifier, and the like is stored in the storage unit of each wireless communication apparatus after completion of mutual authentication between the apparatuses. At the time of data communication, a wireless data communication path is ensured by using the stored authentication information.

As a method of authenticating wireless communication apparatuses while taking security measures, the following method is proposed (Japanese Patent No. 3422683). In performing wireless communication between two communication apparatuses, when the first apparatus is partially engaged with the docking port of the second apparatus (first communication means), the first and second apparatuses are automatically connected to each other through the second communication means, thereby allowing the apparatuses to exchange address identifiers. According to this method, no address identifier or encryption key is disclosed to any communication apparatuses which are not located within a sufficiently nearby range, and hence an improvement in security can be expected.

There is also proposed a technique in which first and second communication devices each having a first communication unit capable of wireless communication and a second communication unit different from the first communication unit determine a communication parameter for wireless communication between the two devices when the two communication units are connected to each other, thereby eliminating the necessity to make each user set a communication parameter necessary for wireless communication (Japanese Patent Laid-Open No. 2002-359623).

As the word length of authentication information which associates two specific wireless communication apparatuses randomly increases, the strength of security increases. If, however, a user is to manually input the information, he/she is forced to perform cumbersome operation. For this reason, authentication information to be manually input by a user tends to be a code with a short word length which can be easily guessed by the third person. The method of performing authentication by infrared communication forces a user to perform cumbersome operation and makes he/she bother with excessively narrow directivity. The method of performing authentication by using a connection cable requires wired connection between apparatuses, resulting in cumbersome operation.

In addition, according to the above prior art, wireless communication apparatuses cannot exchange any authentication information such as a communication parameter and address identifier unless wired connection or coupling to a docking port is performed before data communication. This forces a user to perform cumbersome operation and also makes it necessary to use different wireless communication means for authentication processing and data communication, resulting in hindrance to the simplification of a wireless communication apparatus, power saving, and a reduction in size.

As described above, the problem is that a system (wireless communication system or print system) which allows a user to easily set authentication information such as a communication parameter and address identifier and is easy for the user to use cannot be provided as an authentication method for a wireless communication apparatus.

DISCLOSURE OF INVENTION

It is an object of the present invention to provide a technique of simplifying operation to be performed by an operator and allowing authentication processing between two wireless communication apparatuses while using a single wireless communication means.

In order to achieve the above object, for example, a wireless communication apparatus according to the present invention has the following arrangement.

There is provided a wireless communication apparatus which has wireless communication means for communicating with a mobile wireless communication device and executes predetermined processing on the basis of received information, characterized by comprising:

instructing means for instructing to start authentication processing in order to start communicating with a wireless communication device;

transmission means for transmitting a search signal containing verification data by the wireless communication means when a start of authentication is instructed by the instructing means; and authentication means for, when a response signal is received by the wireless communication means from one wireless communication device after the search signal is transmitted by the transmission means and when the verification data is contained in the response signal transmitting authentication information to the wireless communication device.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 6 is a view showing an example of a state of the display unit of each of the wireless communication host apparatus and the wireless communication device during authentication processing in the embodiment;

FIGS. 9A to 9C are graphs showing the characteristics of radio signals used by the wireless communication host apparatus to identify a wireless communication device as an authentication target in the embodiment;

FIGS. 14A and 14B are flowcharts showing in parallel the relationship between processing in the wireless communication host apparatus and processing in the wireless communication device in the embodiment.

BEST MODE FOR CARRYING OUT THE INVENTION

An embodiment of the present invention will be described in detail below with reference to the accompanying drawings.

Figure 1:
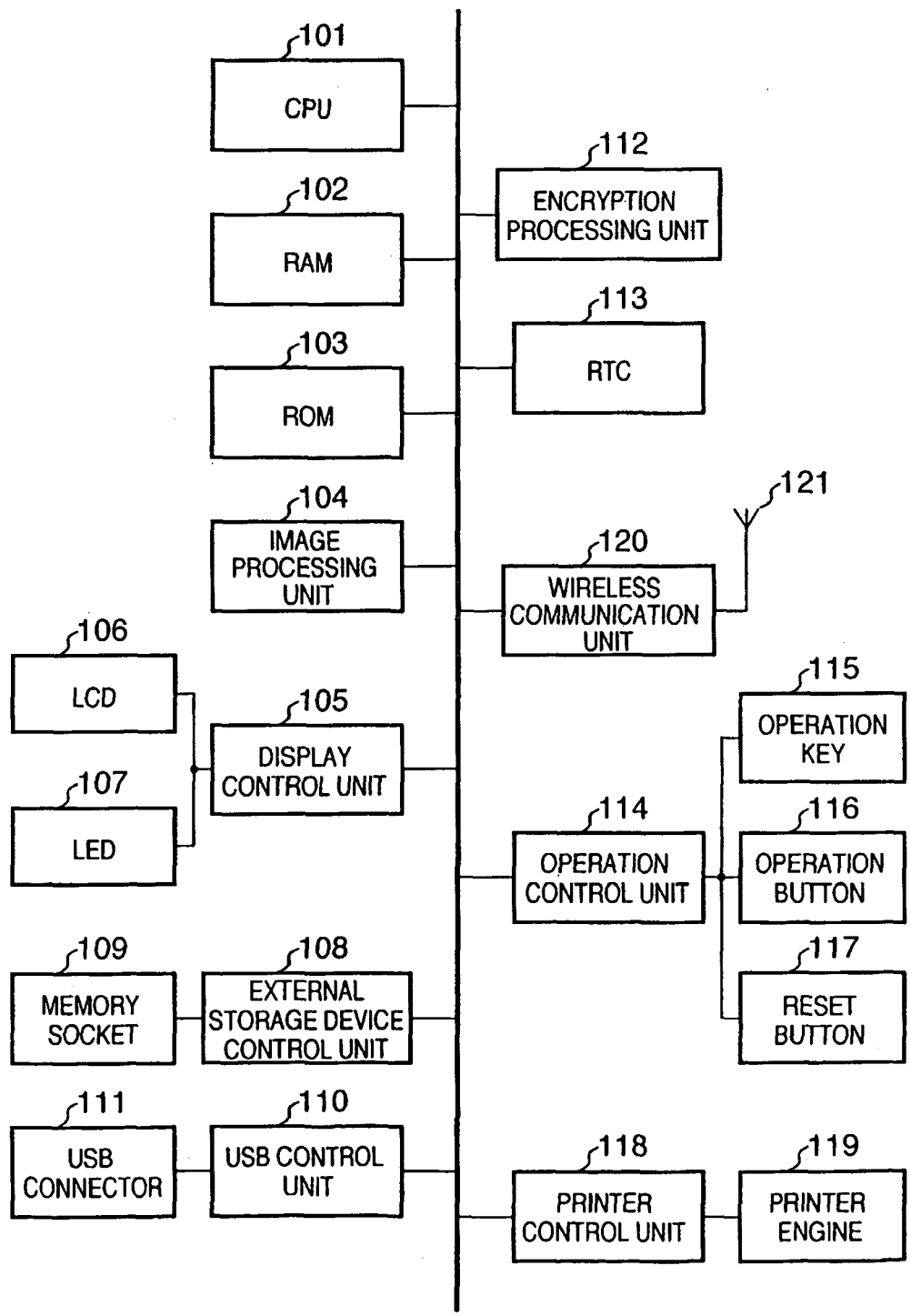
FIG. 1 is a block diagram showing the arrangement of a printer apparatus as a wireless communication host apparatus according to an embodiment.

FIG. 1 is a block diagram showing the arrangement of printer apparatus 1 (to be referred to as host 1 hereinafter) as a wireless communication host apparatus according to an embodiment of the present invention.

Referring to FIG. 1, reference numeral 101 denotes a CPU which controls overall host 1; 102, a RAM which is used as the work area of the CPU 101; 103, a ROM which stores processing sequences executed by the CPU 101 and comprises a rewritable nonvolatile memory such as a flash memory; 104, an image processing unit which is used to convert digital image data or the like into digital data which can be printed; 105, a display control unit for various kinds of display; 106, a liquid crystal display device which is used to display a menu for the check on digital image data and the execution of various kinds of settings; 107, a light-emitting diode which is used as an indicator which indicates the processing state of host 1; 108, a control unit for an external storage device, which controls read operation of digital data stored in a storage medium such as a compact flash (registered trademark) or memory stick (registered trademark) inserted in a memory socket 109 and write operation of digital data in the storage medium; 110, a control unit for a USB interface, which is connected to an apparatus having another USB interface through a USB connector 111; 112, an encryption processing unit which is used to encrypt authentication information and data for wireless communication; 113, a real-time clock which is used for authentication period counting and access time recording; 120, a wireless communication unit for wireless communication; 121, an antenna for wireless communication; 114, a control unit for buttons and the like for various kinds of settings, which is used to transfer operation information of an operation key 215, an operation key 115, an operation button 116 for an instruction to start authentication processing, and a reset button 117 to the CPU 101; and 118, a control unit for the printer function of host 1, which causes a printer engine 119 to print digital data.

Figure 2:
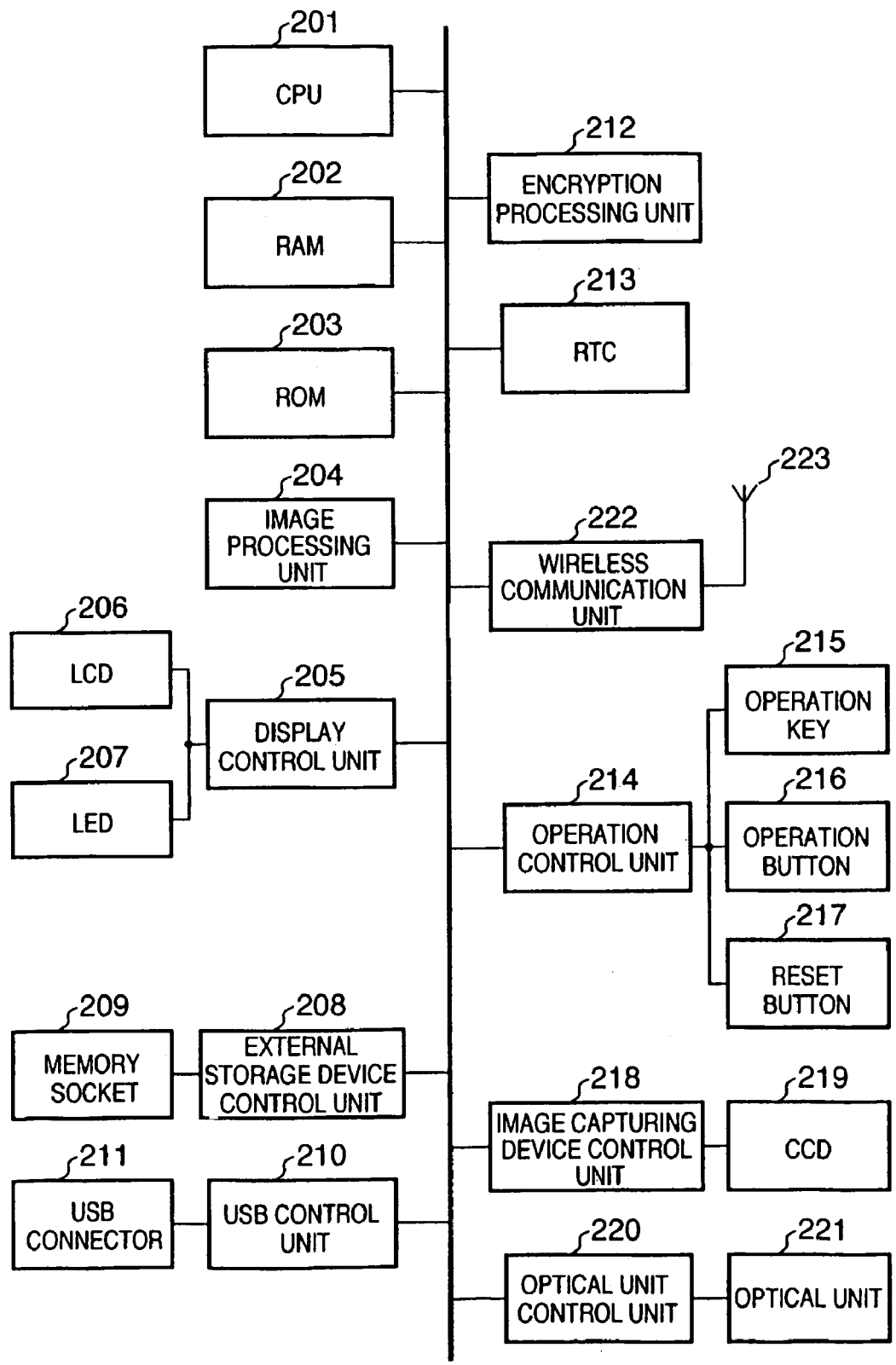
FIG. 2 is a block diagram showing the arrangement of a digital still camera as a wireless communication device in the embodiment.

FIG. 2 is a block diagram showing digital still camera 2 (to be referred to as device 2 hereinafter) as a typical wireless communication device according to the embodiment of the present invention, i.e., a typical portable or mobile device.

Referring to FIG. 2, reference numeral 201 denotes a CPU which controls the overall device; 202, a RAM which is used as the work area of the CPU 201; 203, a ROM which stores processing sequences executed by the CPU 201 and comprises a rewritable nonvolatile memory, e.g., a flash memory; 204, an image processing unit which is used to convert a captured image into digital image data; 205, a control unit for various kinds of display; 206, a liquid crystal display device which is used to display a menu for the check on a captured image and the execution of various kinds of settings; 207, a light-emitting diode which is used as an indicator which indicates the processing state of device 2; 208, a control unit for an external storage device, which controls write operation of digital data in a storage medium such as a compact flash (registered trademark) ® or memory stick ® inserted in a memory socket 209 and read operation of digital data stored in the storage medium; 210, a control unit for a USB interface, which is connected to an apparatus having another USB interface through a USB connector 211; 212, an encryption processing unit which is used to encrypt authentication information and data for wireless communication; 213, a real-time clock which is used for authentication period counting and access time recording; 222, a wireless communication unit for wireless communication; 223; an antenna for wireless communication; 214, a control unit for buttons and the like for various kinds of operations, which is used to transfer operation information of an operation button 216 for an instruction to start authentication processing, and a reset button 217 to the CPU 201; 218, a control unit for the image capturing device of device 2, which controls a CCD 219: and 220, a control unit for an optical unit 221, which controls the optical unit 221 mainly comprising a lens and its driving system.

Figure 3:
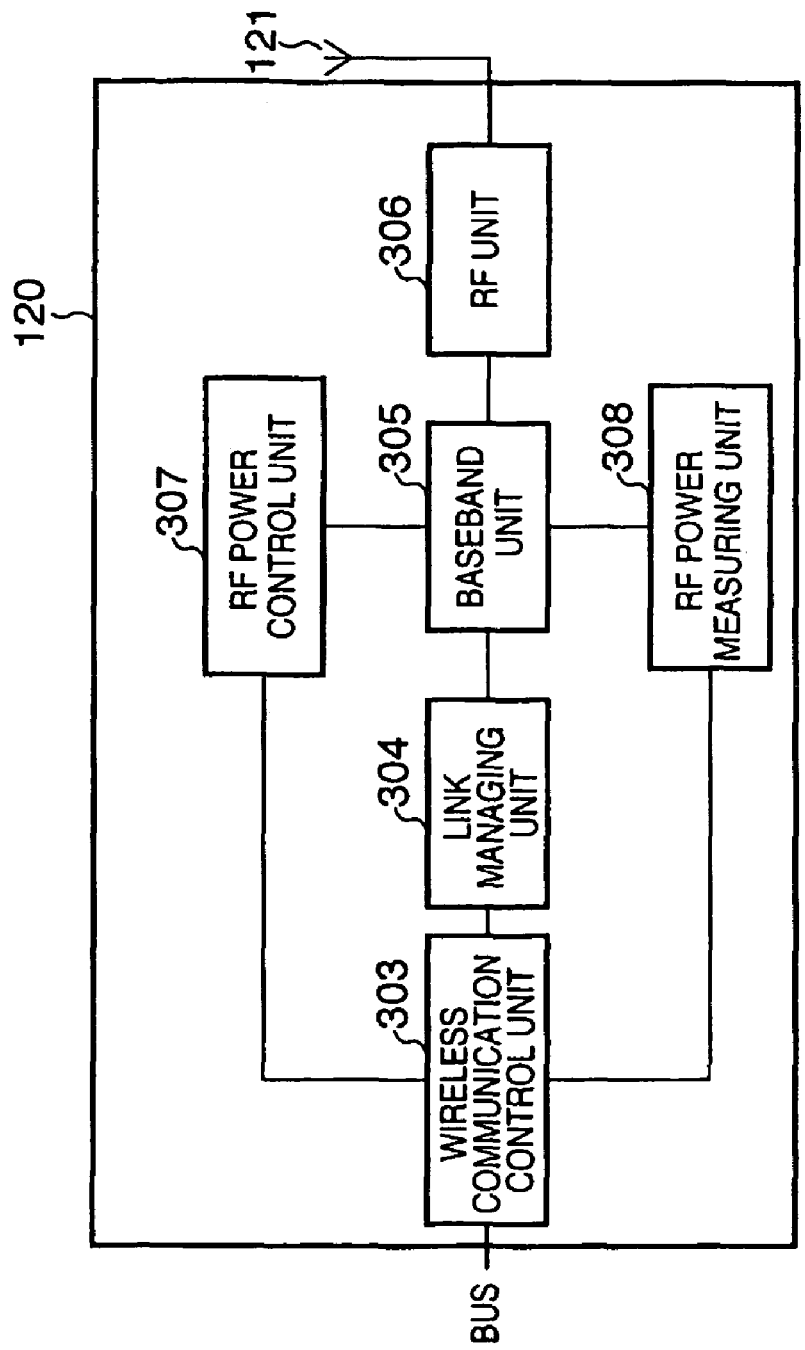
FIG. 3 is a block diagram showing the arrangement of a wireless communication unit in the wireless communication host apparatus in the embodiment.

FIG. 3 is a block diagram of the wireless communication unit 120 in wireless communication host apparatus (a printer in this embodiment) 1 according to this embodiment.

Note that the wireless communication unit 222 in device (a digital still camera in this embodiment) 2 has the same arrangement as that of the wireless communication unit 222, and hence a description of the wireless communication unit 222 in the digital still camera will be omitted. In this embodiment, for the sake of simplicity, the following description is based on the ad hoc mode of IEEE802.11b. However, another wireless communication standard may be used.

Referring to FIG. 3, reference numeral 303 denotes a control unit which controls the overall wireless communication unit, in which a CPU and nonvolatile memory are incorporated; 304, a link managing unit for a communication protocol; 305, a wireless baseband unit which transmits/receives radio waves to/from an RF unit 306 through the antenna 121; 307, an RF power control unit which controls radio wave transmission/reception power; and 308, an RF power measuring unit which measures radio wave transmission/reception power.

The arrangements of host 1 and device 2 in the embodiment have been described above.

A method of allowing host 1 and device 2 to mutually recognize and easily set authentication information such as a communication parameter or address identifier necessary for wireless connection will be described next on the basis of the above arrangement.

Figure 4:
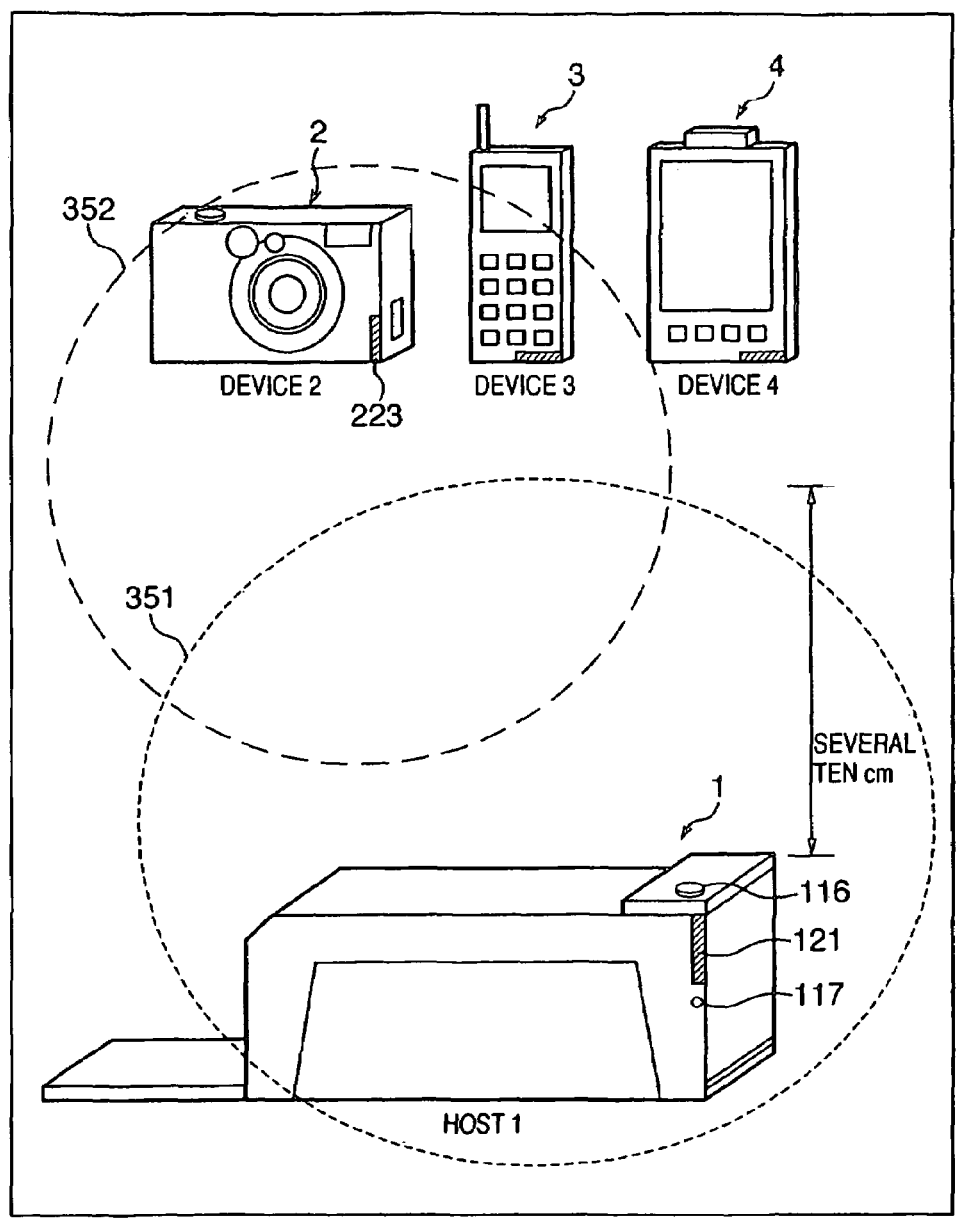
FIG. 4 is a view showing an example of a state before authentication between the wireless communication host apparatus and the wireless communication device in the embodiment.

FIG. 4 is a view showing an example of a state before authentication between printer 1 as a wireless communication host apparatus (to be referred to as host 1 and generically referred to as a host hereinafter) and digital still camera 2 as a wireless communication device, cellular-telephone 3, and PDA 4 (to be referred to as device 2, device 3, and device 4 and generically referred to as devices hereinafter).

Assume that devices 2, 3, and 4 each have the same arrangement as that comprising the wireless communication unit 120 and antenna 121 shown in FIG. 3. A host and a device exchange authentication information, establish a wireless data communication path, and perform wireless data communication by using this wireless communication unit.

An example of operation to be performed when authentication is performed between host 1 and device 2 will be described below.

First of all, when the button 116 of host 1 is pressed to start authentication processing on the host side, host 1 shifts to the authentication mode in which RF power is decreased to a level lower than that during normal wireless data communication (reception processing for print data), thereby limiting an authentication zone 351 of host 1 to, for example, several ten cm. Likewise, when the operation key 215 of device 2 is operated to shift device 2 to the authentication mode in order to start authentication processing on the device side, device 2 decreases the RF power to a level lower than that during wireless data communication, thereby limiting an authentication zone 352 of device 2 to, for example, several ten cm.

As shown in FIG. 4, since host 1, device 2, device 3, and device 4 are located outside a distance at which mutual authentication is not performed, i.e., outside the authentication zone 351 of host 1 and the authentication zone 352 of device 2 at the time of authentication, even if host 1 searches for a device which can be authenticated in this state, device 2 cannot be found. Therefore, no authentication is performed.

Figure 5:
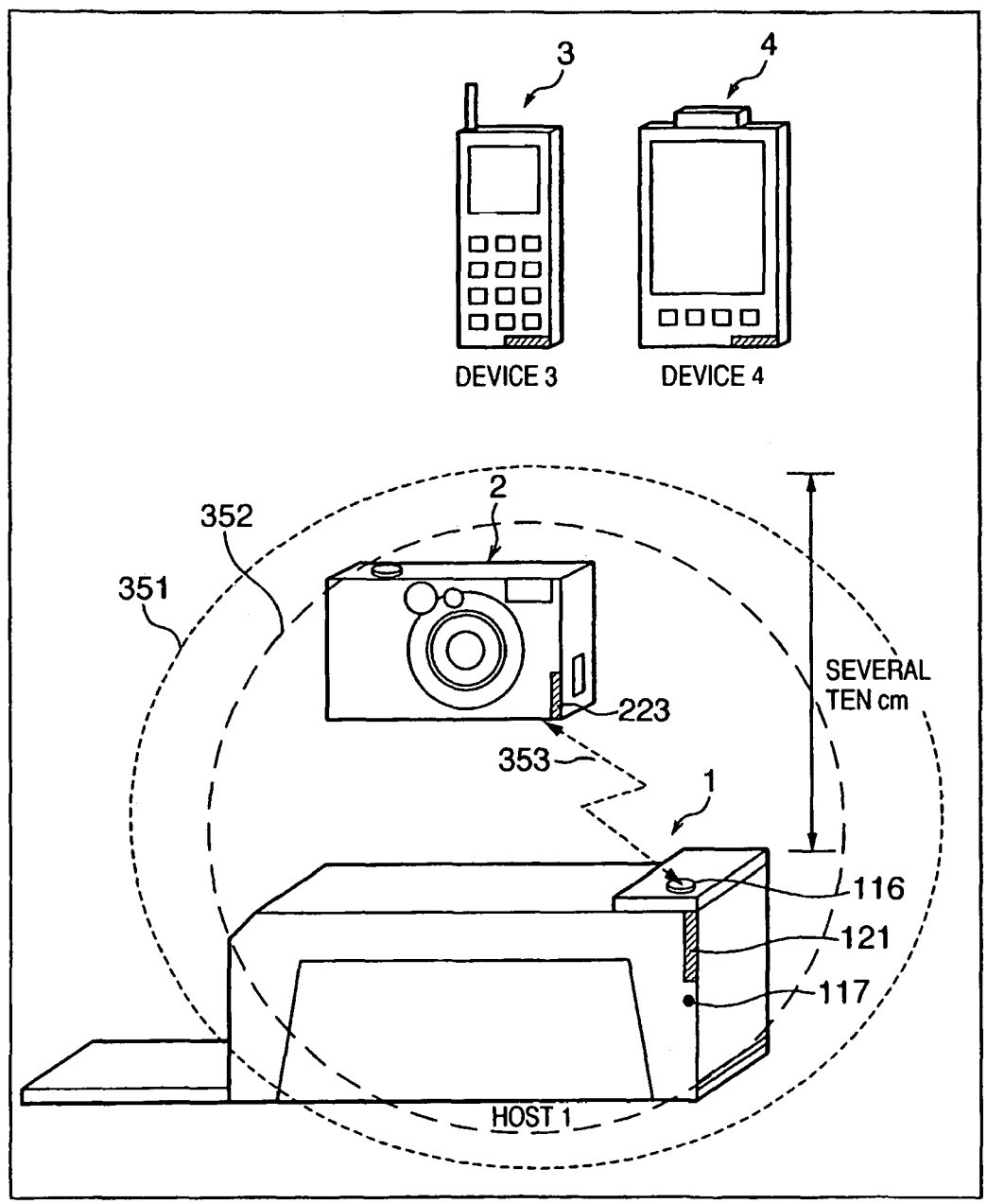
FIG. 5 is a view showing an example of a state during authentication between the wireless communication host apparatus and the wireless communication device in the embodiment.

As shown in FIG. 5, when device 2 having the authentication zone 352 is brought close to the authentication zone 351 of host 1 after both host 1 and device 2 are made to shift to the authentication mode, host 1 and device 2 detect and recognize each other by using the wireless communication units 120 and 222 and the antennas 121 and 223, and exchange authentication information such as a communication parameter and address identifier necessary for wireless communication connection. Note that even if device 3 and device 4 shift to the authentication mode, since they are located outside the authentication zone 351 of host 1, they do not perform detection and recognition of themselves or exchange any authentication information.

FIG. 6 is a view showing an example of operation of host 1 and device 2 during authentication processing, which have shifted to the authentication mode, and display on the liquid crystal display device. Operation of host 1 which has shifted to the authentication mode will be described first.

Upon shifting to the authentication mode, host 1 decreases the RF power during wireless data communication to limit the authentication zone 351 of host 1 to a range (e.g., a range of several ten cm) sufficiently narrower than the normal wireless data communicative range. Upon shifting to the authentication mode, host 1 displays an instruction on the liquid crystal display device 106 to bring the device as a wireless connection target to host 1. At this time, as information to be displayed on the liquid crystal display device 106, a character string, an icon, an actual image that has already been registered in host 1, or the like may be used. Note that information indicating that host 1 is performing authentication processing may be explicitly demonstrated by displaying it on the liquid crystal display device 106 or using the light-emitting diode 107 as an indicator which lights up and blinks.

The operation of device 2 which has shifted to the authentication mode will be described next. Upon receiving an instruction to shift to the authentication mode, device 2 decreases the RF power to a level lower than that during wireless data communication, thereby limiting the authentication zone 352 of device 2 to a sufficiently narrow range (e.g., a range of several ten cm) like host 1. Upon shifting to the authentication mode, device 2 displays an instruction on the liquid crystal display device 206 of device 2 to bring device 2 close to a host as a wireless connection target. At this time, as information to be displayed on the liquid crystal display device 206, a character string, an icon, an actual image that has already been registered in device 2, or the like may be used. Note that information indicating that device 2 is performing authentication processing may be explicitly demonstrated by displaying it on the liquid crystal display device 206 or using the light-emitting diode 207 as an indicator which lights up and blinks.

A characteristic feature of this embodiment is that a remote apparatus with which wireless data communication is to be really performed (to be referred to as a real connection target hereinafter) is detected and identified by using the displacement of an RF power due to the distance between the host and the device and directivity. How the RF power between the host and the device displaces with a change in inter-apparatus distance or directivity in this embodiment will be described below with reference to FIGS. 7A to 8B.

Figure 7A:
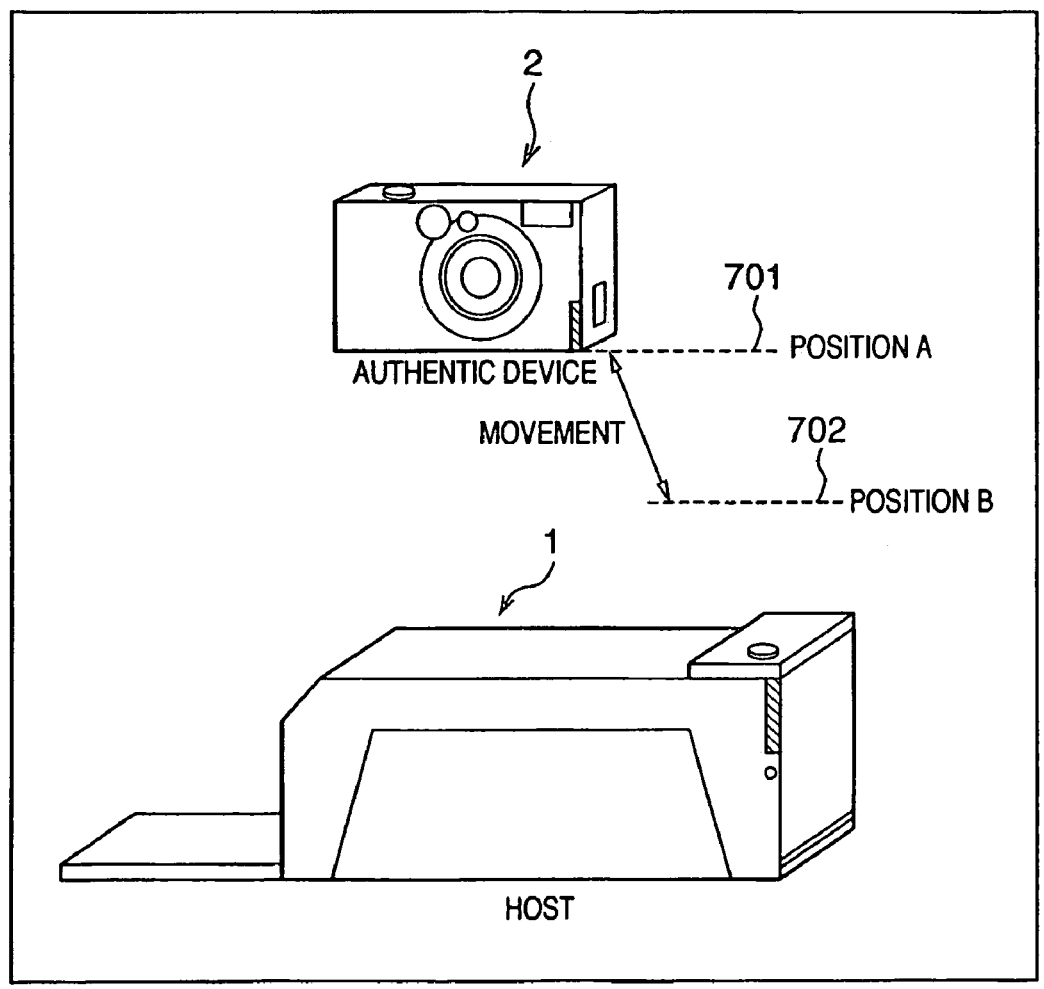
FIGS. 7A and 7B are graphs showing an example of RF power/distance characteristics during authentication processing between the wireless communication host apparatus and the wireless communication device as an authentication target in the embodiment.
Figure 7B:
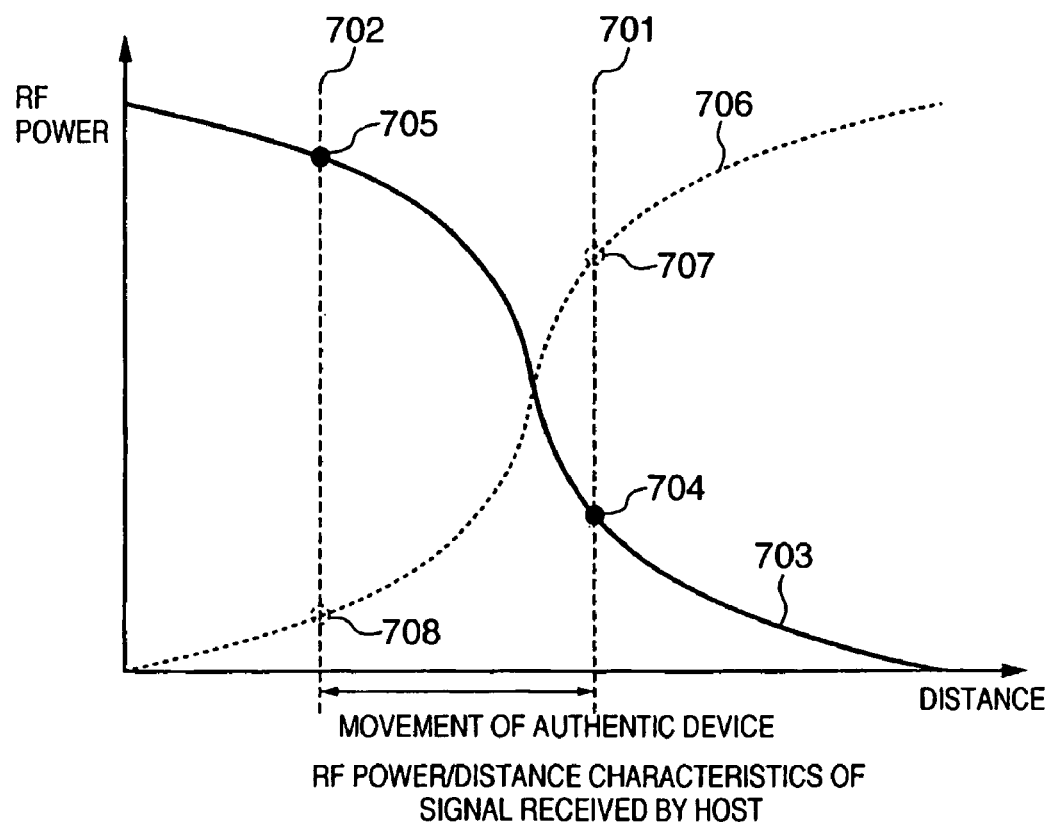

FIGS. 7A and 7B are views showing the RF power/inter-apparatus distance characteristics of host 1 during authentication processing and device 2 as a real connection target (to be referred to as an authentic device hereinafter). When an authentic device which has shifted to the authentication mode is moved from a position 701 to a position 702 so as to be brought close to a host, an RF power 703 displaces from a point 704 to a point 705, as shown in the graph of FIG. 7B. This displacement of the RF power is measured by the RF power measuring unit 308 of the host to determine whether the corresponding device is an authentic device. In contrast, when the authentic device which has shifted to the authentication mode is moved from the position 702 to the position 701 so as to be located away from the host, the RF power 703 also changes. This displacement may therefore be measured by the RF power measuring unit 308 of the host to determine whether the corresponding device is an authentic device. In addition, assume that, owing to the antenna arrangements of the host and device, an RF power 706 received by the host decreases from a point 707 to a point 708 as the host and the device are brought close to each other. In this case as well, whether the corresponding device is an authentic device can be determined by measuring the displacement of the RF power-using the RF power measuring unit 308.

Figure 8A:
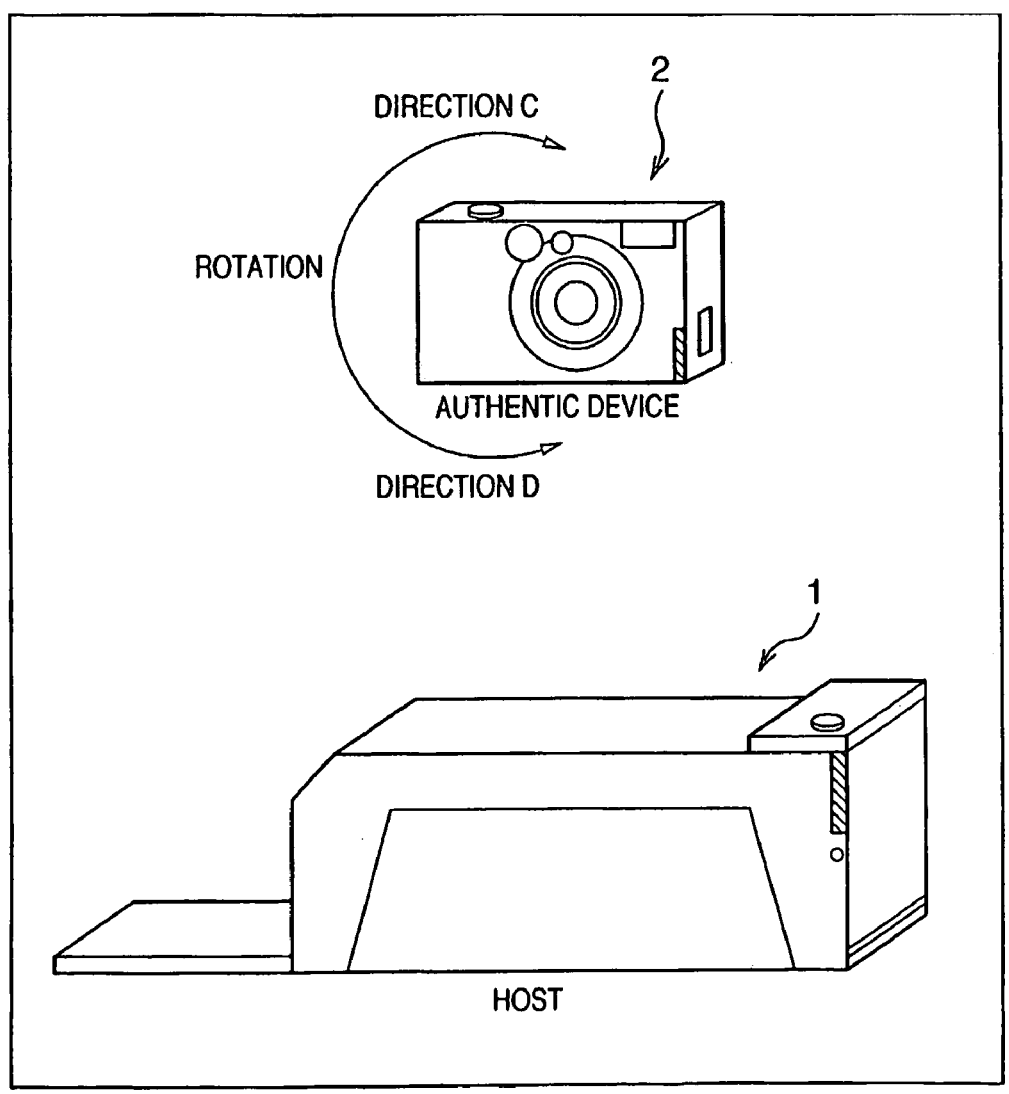
FIGS. 8A and 8B are graphs showing an example of RF power/radiation characteristics during authentication processing between the wireless communication host apparatus and the wireless communication device as an authentication target in the embodiment.
Figure 8B:
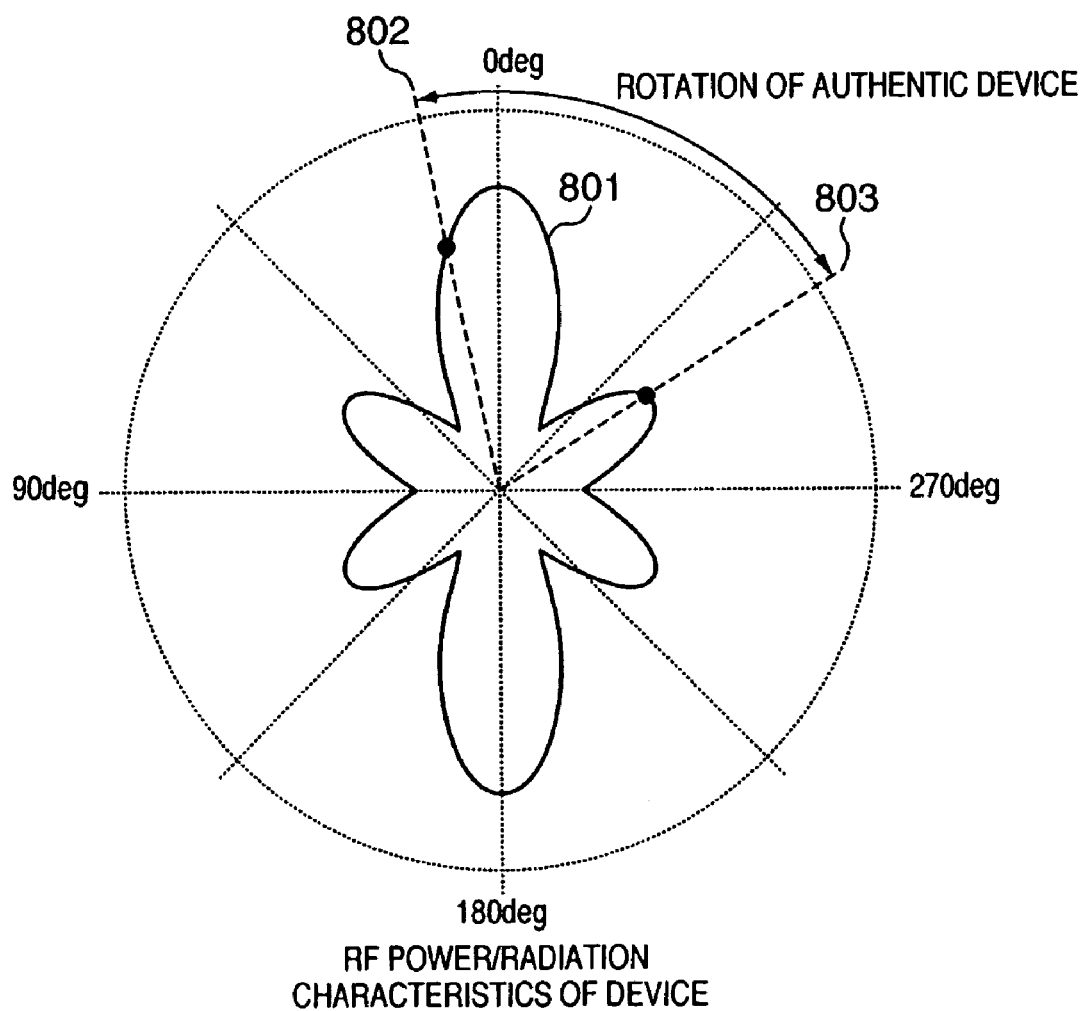

FIGS. 8A and 8B are views showing the RF power/directivity characteristics of a host during authentication processing and an authentic device. When the authentic device which has shifted to the authentication mode is rotated while being located in the authentication zone 351, an RF power 801 received by the host displaces from a point 802 to a point 803 due to the directivity of the antenna of the device. This displacement is measured by the RF power measuring unit 308 of the host to determine whether the corresponding device is an authentic device.

A change in RF power is often correlative to a change in bit rate, bit error rate, or transfer efficiency. The above displacement detection method therefore holds even if the description concerning the RF power is replaced with that concerning a data string such as a bit rate, bit error rate, or transfer efficiency, and RF power measurement by the RF power measuring unit 308 in the displacement detection method is replaced with numerical calculation by the wireless communication control unit 303. In the following description, when a data string such as an RF power, bit rate, bit error rate, or transfer efficiency will be generically referred to as an RF power.

FIGS. 9A to 9C are graphs for explaining the processing for detecting and recognizing an authentic device when a host apparatus and a device start authentication processing, and the authentic device and another device exist in the authentication zone 351 of the host.

Assume that the authentic device is moved or rotated, while both the authentic device and another device are in the authentication mode. In this case, when the RF power received by the host from the authentic device is proportional to the square of time, the RF power received by the host in the interval from time t1 to time t2 changes from a point 903 to a point 904 in the graph of FIG. 9A. Since another device is not moved or rotated, the RF power does not change from a point 913 to a point 914 in the interval from t1 to t2.

The host samples the RF powers received from the authentic device and another device at times near times t1 and t2 a plurality of number of times, and calculates primary derivatives. In this case, as indicated by the graph of FIG. 9B, the primary derivative of the RF power received by the host from the authentic device changes from a point 905 to a point 906. In contrast, the primary derivative of the RF power from another device is zero. Checking the displacement of this primary derivative makes it possible to detect and identify the authentic device and another device. In this case, since another device exhibiting no displacement of the primary derivative is identified as not being a real connection target, the host exchanges no authentication information.

The host samples the RF powers received from the authentic device and another device at times near times t1 and t2 a plurality of number of times and calculates the secondary derivatives of the RF powers. In this case, as indicated by the graph of FIG. 9C, the secondary derivative of the RF power received by the host from the authentic device is constant from a point 907 to a point 908. In contrast, the secondary derivative of the RF power from another device is zero. An authentic device and another device may be detected and identified by checking the displacement of this secondary derivative.

Note that the changes in RF power received by the host from the device over time indicated by FIGS. 9A to 9C are an example. In practice, the RF power received by the host from the authentic device is not always proportional to the square of time, and the RF power received by the host from another device is not always constant. For this reason, in order to improve the accuracy of detection and identification of the authentic device, the host may select sampling times, a sampling count, and a differentiation count in accordance with an assumed wireless communication system.

A sequence in which the host performs authentication processing with respect to the authentic device by using the above processing for detection and identification of the authentic device will be described below.

Figure 10A:
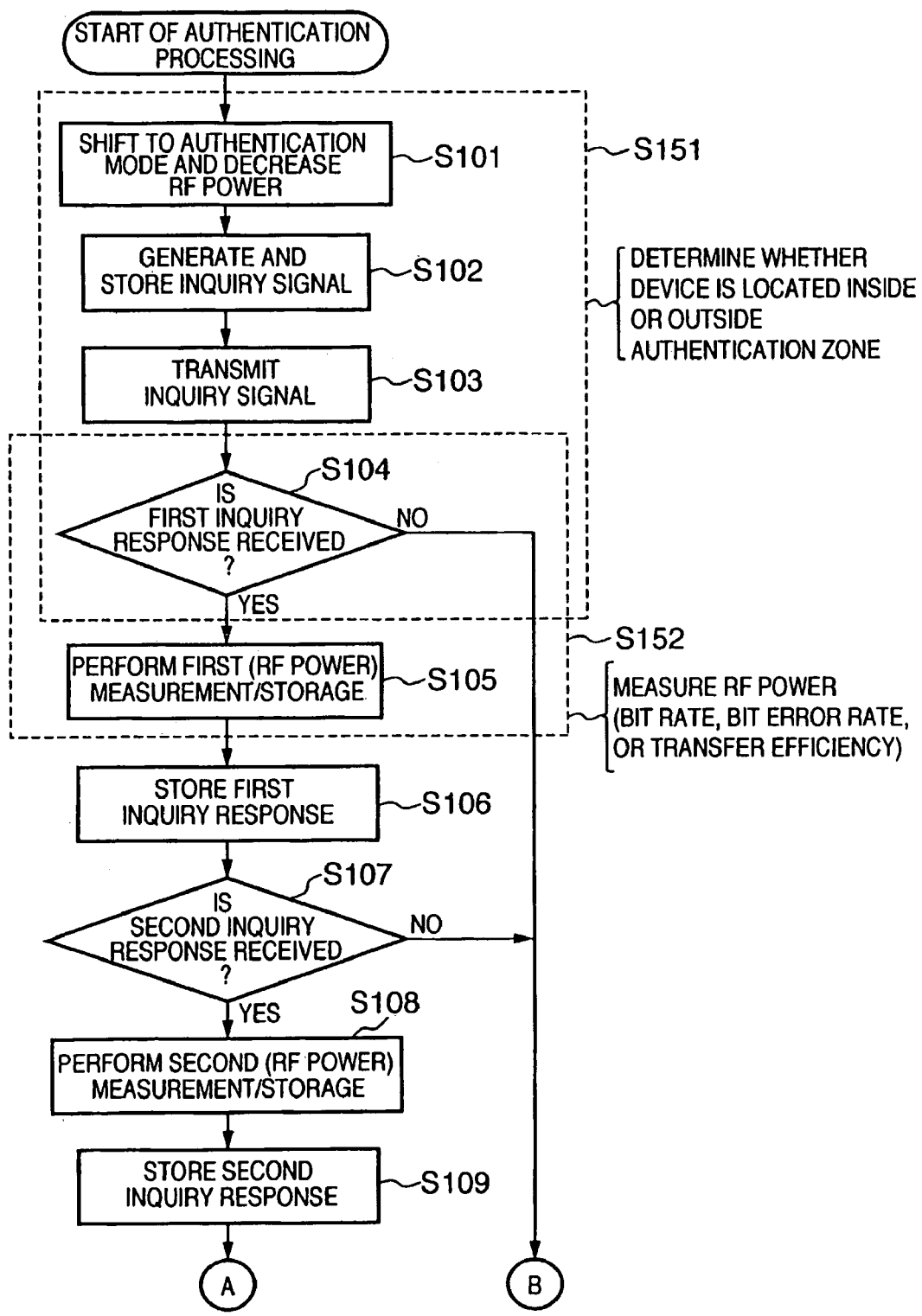
FIGS. 10A and 10B are flowcharts showing an authentication processing sequence in the wireless communication host apparatus in the embodiment.
Figure 10B:
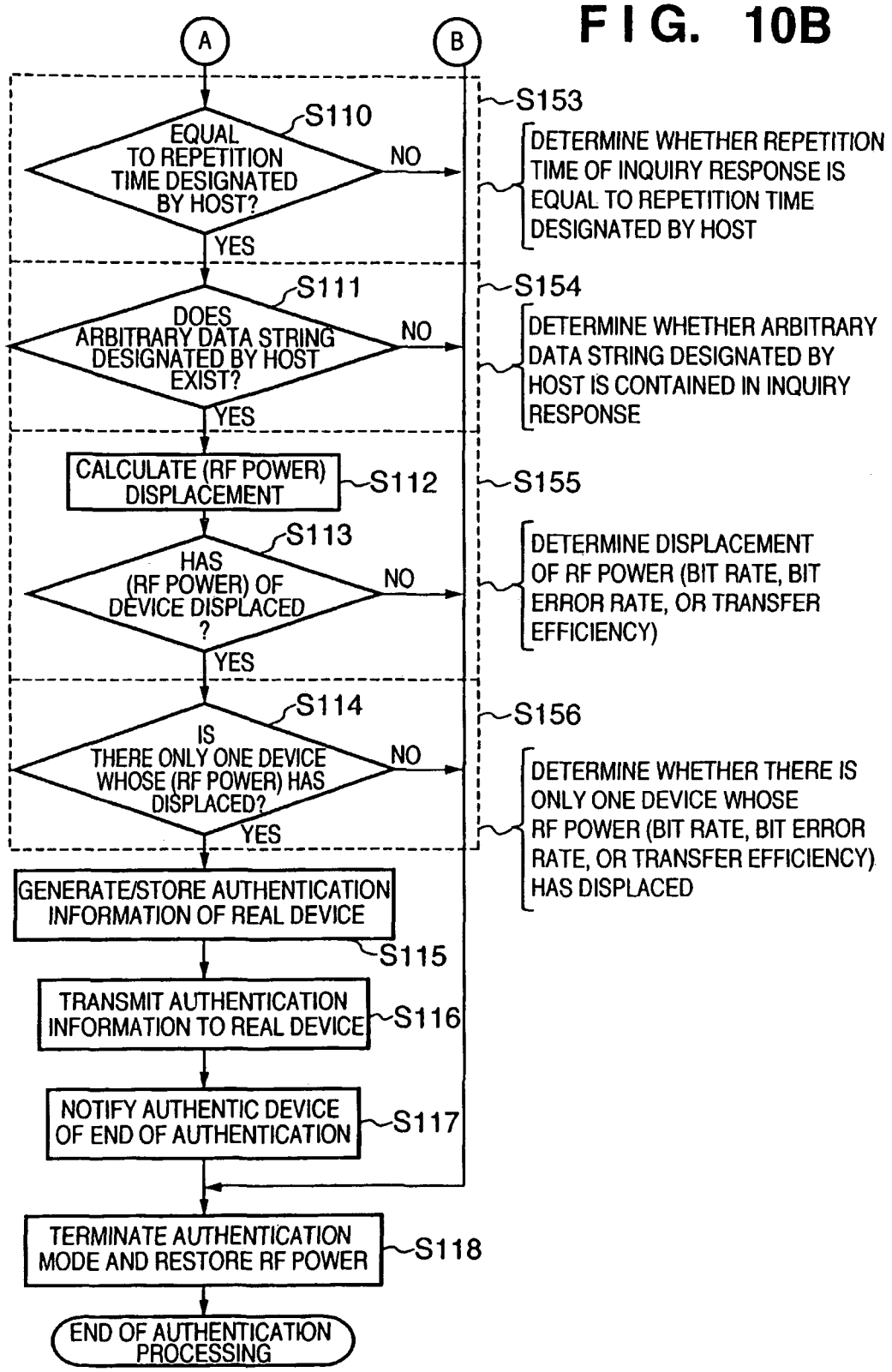

FIGS. 10A and 10B are flowcharts showing a processing sequence from the start of authentication processing by the host to the end of authentication processing. A program associated with this processing sequence is stored in the ROM 103.

First of all, when the host is shifted to the authentication mode by operating a button or the like provided for the host, the host decreases the transmission/reception RF power to a level lower than that for data communication so as to decrease the radio signal range, thereby setting an authentication zone (step S101).

Figure 11:
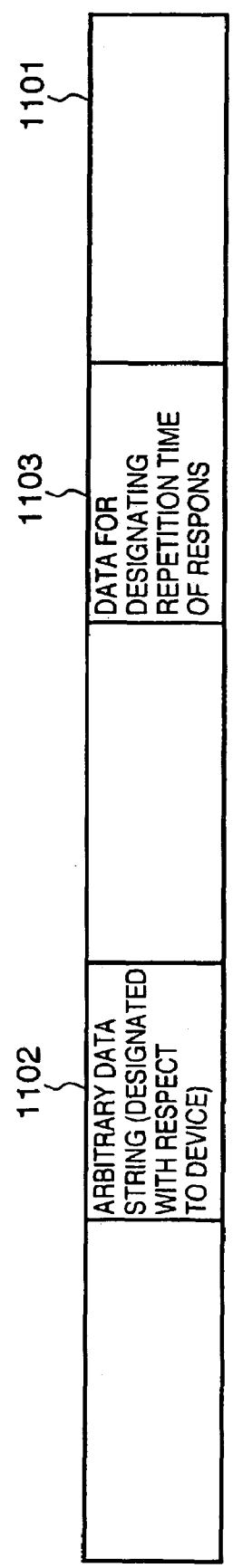
FIG. 11 is a view showing the data format of an inquiry signal transmitted by the wireless communication host apparatus in the embodiment.

The host then generates and stores an inquiry (synonymous with a connection request) signal 1101 like that shown in FIG. 11 (step S102). The inquiry signal 1101 contains an arbitrary data string 1102 and a data string 1103 which designates an inquiry response repetition time interval. Upon receiving the inquiry signal, the device returns an inquiry response upon containing the arbitrary data string 1102 (serving also as verification data) in the inquiry response. The data string 1102 is used by the host to determine whether the received signal is a response and detect the displacement of the bit rate, bit error rate, transfer efficiency, or the like of the data string. The data string 1103 (information indicating a time interval) which designates the repetition time interval of inquiry responses is used to determine the repetition time interval of inquiry responses to be returned from the device.

Upon generating the inquiry signal 1101, the host transmits the inquiry signal 1101 into the authentication zone to search for a device (step S103).

At this time, the inquiry signal is transmitted upon setting ESSID (Extended Service Set Identifier) to a provisional character string and a channel to "1" without any WEP key (Wired Equivalent Key). Note, however, that when authentication processing has succeeded, a true ESSID, WEP key, and channel are transmitted as authentication information. Subsequently, wireless data communication is performed by using this information.

Figure 12:
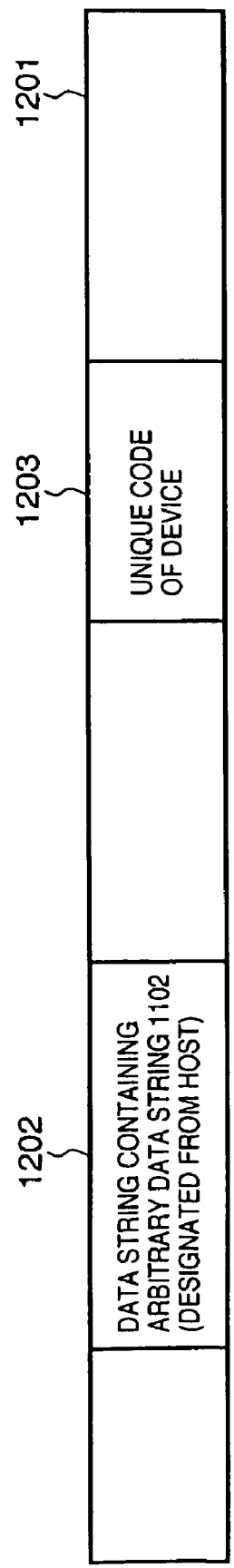
FIG. 12 is a view showing the data format of an inquiry response signal returned by the wireless communication device in the embodiment.

If a device which has shifted to the authentication mode exists in the authentication zone of the host, an inquiry response 1201 like that shown in FIG. 12 is returned from the device. The host then determines whether an inquiry response is received (step S104). The inquiry response 1201 returned by the device contains a data string 1202 including the data string 1102 designated by the inquiry signal 1101 from the host and a unique code 1203 such as a MAC address held in the ROM of the device. The unique code 1203 is used for wireless connection control of MAC address filtering and the like on the host side and is also used to generate host authentication information.

If the inquiry response 1201 is not returned within a predetermined allowable time range, the host determines that no device which has shifted to the authentication mode exists within the authentication zone of the host. The host then terminates the authentication mode. The flow advances to step S118 to restore the RF power so as to set the normal data communication state.

Upon receiving the first inquiry response 1201, the host measures/stores the reception RF power a plurality of number of times (step S105), and stores part of the data string of the inquiry response 1201 (step S106).

The inquiry response 1201 is returned to the host at the time intervals designated by the data string 1103 contained in the inquiry signal 1101, and hence the host determines whether the inquiry response 1201 is received again (step S107). Upon receiving the second inquiry response 1201, the host measures/stores the second reception RF power a plurality of number of times (step S108), and stores part of the data string of the second inquiry response 1201 (step S109).

Upon storing the reception RF powers and data strings of the first and second inquiry responses 1201, the host determines whether the repetition time of the inquiry responses 1201 is equal to the time designated by the data string 1103 (step S110). If the repetition time of the inquiry responses 1201 differs from the designated time, the host determines that the responses are not from the authentic device, and terminates the authentication mode.

The host then determines whether the arbitrary data string 1102 is contained in the inquiry response 1201 (step S111). If the arbitrary data string 1102 designated by the host is not contained in the inquiry response 1201 or a data string different from the designated data string is contained in it, the host determines that the response is not from the authentic device, and terminates the authentication mode.

The host calculates the displacements of the reception RF powers of the first and second inquiry responses 1201 (step S112). The calculation in step S112 may be performed by using the processing described with reference to FIGS. 9A, 9B, and 9C. The host determines, on the basis of the result calculated in step S112, whether the displacement of the RF power of the received inquiry response 1201 falls within a predetermined range specified by the system (step S113).

In this case, if the RF power has not displaced or the displacement falls outside the range specified by the system, the host terminates the authentication mode.

Note that the "displacement" in this case is the absolute value of a difference because the plus and minus signs are ignored. If this displacement is substantially 0 (or more accurately, equal to or less than a threshold $T1$ near 0) or equal to or more than a threshold $T2 (T2>T1>0)$, the host determines that authentication has failed, and terminates the authentication mode.

If the displacement of the RF power falls within the range (larger than the threshold $T1$ and less than the threshold $T2$) specified by the system, the host determines whether the RF power of only one device has displaced, on the basis of whether the device unique code of the data of the inquiry response coincides with the corresponding code (step S114). If there are a plurality of devices whose RF powers have displaced in the authentication zone, the host terminates the authentication mode. If there is only one device whose RF power has displaced, the host recognizes the device as an authentic device, and generates and stores the authentication information of the authentic device (step S115).

The generated authentication information is transmitted to the authentic device (step S116). The host then notifies the authentic device of the end of the authentication processing (step S117), terminates the authentication mode, and restores the RF power (step S118). If wireless data communication is not to be performed immediately after the end of the authentication processing, the RF power may be turned off after the end of the authentication mode to set the host in the idle state.

When the above flow comes to an end, the host and device ensure a wireless communication path 353 by using the exchanged authentication information. This makes it possible to perform wireless data communication. In this embodiment, since the host is a printer and the device is a digital still camera, the image captured by the digital still camera is printed out.

In the authentication flow of the host described with reference to FIGS. 10A and 10B, the determination conditions for an authentic device can be classified into the following processes (S151) to (S156):

Step S151: determining in the processing from step S101 to step S104 whether the device is located inside or outside the authentication zone of the host;

Step S152: measuring an RF power, bit rate, bit error rate, and transfer efficiency;

Step S153: determining whether the repetition time of inquiry responses is equal to the repetition time designated by the host;

Step S154: determining whether the arbitrary data string designated by the host is contained in the inquiry response;

Step S155: determining whether the RF power, bit rate, bit error rate, or transfer efficient has displaced; and Step S156: determining whether there is only one device whose RF power, bit rate, bit error rate, or transfer efficiency has displaced.

Although a distance based on which it is determined in the process (S151) whether a given device is located inside or outside the authentication zone may be arbitrarily set, the strength of security decreases as the authentication zone increases, resulting in difficulty in determining an authentic device. It is therefore preferable to minimize the distance. That is, it is appropriate to set about several ten cm as in this embodiment.

A process similar to the process (S152) is repeated twice in the case shown in FIGS. 10A and 10B. However, the device detection accuracy may be improved by repeating this process a plurality of number of times.

The sequence of the processes (S155 and S156) from the above process (S153) can be arbitrarily set. In addition, another determination step other than the above step may be combined or the determination step may be omitted. If a device can be specified by a combination of at least one of the determination processes in steps S151 to S155 and the determination process in step S156, the device may be determined as an authentic device.

Figure 13:
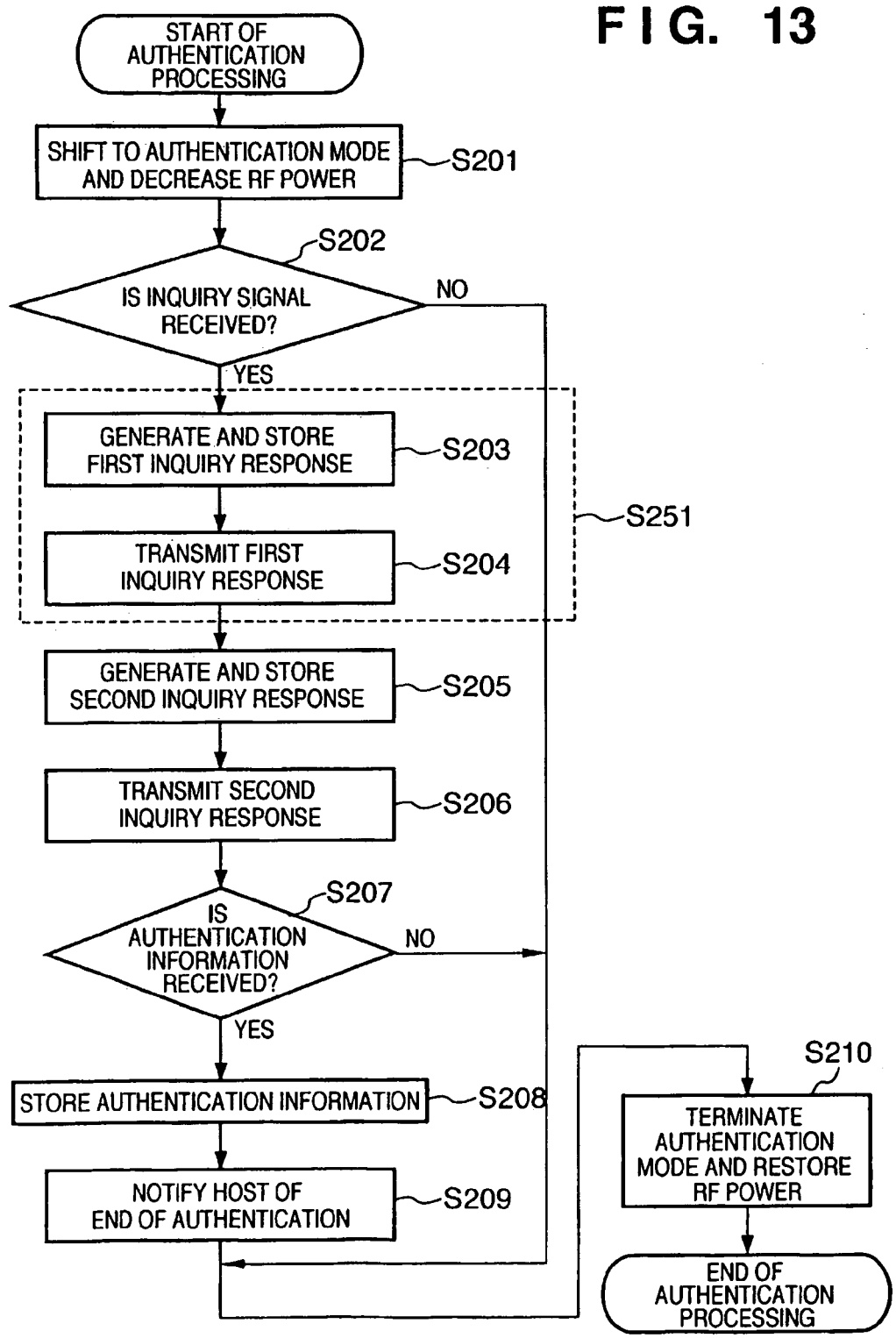
FIG. 13 is a flowchart showing an authentication processing sequence in the wireless communication device in the embodiment.

A sequence for authentication processing with respect to a host on the device side will be described next. FIG. 13 is a flowchart showing the processing from the time when the device (a digital still camera in the embodiment) starts authentication processing to the time when the authentication processing ends. A program corresponding to this flowchart is stored in the ROM 203.

First of all, when the device is shifted to the authentication mode by operating a button or the like provided for the device, the device decreases the transmission/reception RF power to a level lower than that for data communication so as to decrease the radio signal range, thereby setting an authentication zone (step S201). At this time, the same wireless parameter as that set when authentication processing is started on the host side is set.

If a host which has shifted to the authentication mode exists in the authentication zone of the device, since the host is searching for the device by transmitting the inquiry signal 1101 like that shown in FIG. 11, the device determines whether the inquiry signal has been received (step S202).

If any host which has shifted to the authentication mode does not exist in the authentication zone, no inquiry signal is received. In this case, the flow advances to step S210, in which the device terminates the authentication mode and restores the RF power for the normal data communication state.

Upon receiving an inquiry signal, the device generates and stores the first inquiry response 1201 like that shown in FIG. 12 (step S203). The inquiry response 1201 contains the data string 1202 including the arbitrary data string 1102 designated by the host and the unique code 1203 such as the MAC address stored in the ROM of the device.

The device then transmits the first inquiry response 1201 to the host a plurality of number of times (step S204). After the first inquiry response is transmitted, the device generates and stores the second inquiry response 1201 (step S205), and transmits the second inquiry response 1201 to the host a plurality of number of times (step S206). Note that the first and second inquiry responses are transmitted to the host at the repetition time intervals designated by the data string 1103 which designates the repetition time of inquiry responses. As described above, this is because this information is one of parameters which are used by the host to determine an authentic device.

A process similar to the process (S251) is repeated twice in the case shown in FIG. 13. However, such a process may be repeated a plurality of number of times depending on the arrangement of the system. Alternatively, the inquiry response 1201 may be generated and stored only once.

Upon transmitting the inquiry response 1201, the device determines whether authentication information is received from the host (step S207). If no authentication information is transmitted from the host or cannot be received from the host, the authentication mode is terminated. If authentication information is received from the host, the device stores the authentication information (step S208). The device then notifies the host of the end of the authentication processing (step S209), terminates the authentication mode, and restores the RF power (step S210).

When the above flow ends, the host and device ensure the wireless communication path 353 by using the exchanged authentication information, and can perform wireless data communication.

Figure 14A:
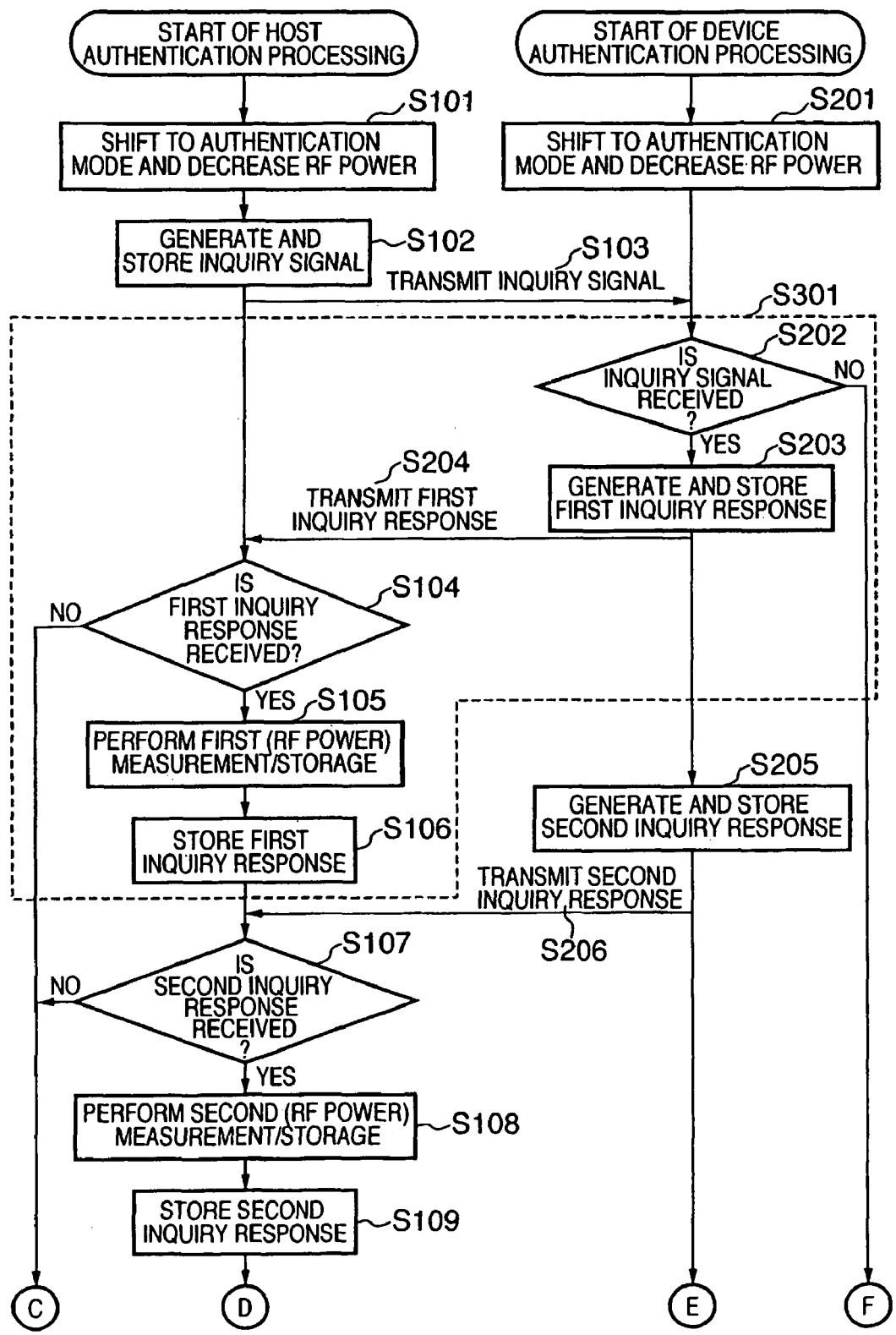

FIGS. 14A and 14B show an authentication process flow as a combination of the host authentication process described with reference to FIGS. 10A and 10B and the device authentication process flow described with reference to FIG. 13. The processing contents are the same as those described above, and hence a description thereof will be omitted. Note, however, that repeating the process (S301) in FIG. 14A, in particular, makes it easy to detect an authentic device and makes it possible to prevent the device of the third person from intercepting authentication information.

It is preferable that both a host and a device be provided with display units, and when authentication processing is normally completed, information indicating the success of authentication (a message, LED lighting, or the like) be displayed. If information indicating an authentication success is displayed on only one display unit, it is known that authentication processing has been done with an unintended device or host, the above processing may be performed again.

As has been described above, according to this embodiment, when two wireless communication apparatuses are to mutually perform authentication, each apparatus decreases its RF power. That is, setting a state in which transmission/reception is allowed only in a communicative range of, for example, about several ten cm makes it possible to prevent another device or another host from entering the zone even by using a single wireless communication means. Only when an inquiry response containing a data string set by a host can be received at predetermined time intervals set by itself, and the reception intensity of the inquiry response changes, the host determines that the device which has transmitted the inquiry response is an authentication target device. Even if, therefore, unintended another device exists near the host, the target device can be easily discriminated from another device as long as the target device is, for example, moved or rotated within the corresponding range, and the authentication processing is complete.

In other words, according to this embodiment, since the processing from the detection and authentication of connection targets which are mutually performed by the wireless communication apparatuses to data communication can be performed by using only a single wireless communication means, simplification of wireless communication apparatuses, power saving, and a reduction in size can be effectively realized. In addition, when wireless communication apparatuses are to mutually perform detection and authentication of connection targets, the RF power is decreased to a level lower than that for data communication to decrease the radio signal range. This reduces the danger of interception of authentication information, thereby achieving high security. When the first wireless communication apparatus uses the displacement of an RF power, bit rate, bit error rate, transfer efficiency, or the like to detect the second wireless communication apparatus as a real connection target, the exchange of authentication information with an unintended wireless communication apparatus can be avoided even in a situation in which wireless communication apparatuses which are not real connection targets exist in the authentication zones of the first and second wireless communication apparatuses. Since authentication information is automatically and seamlessly exchanged between the first and second wireless communication apparatuses after wireless communication apparatuses as real connection targets are mutually detected, this technique can be applied to even a wireless communication apparatus having no display unit or operation unit and allows it to perform authentication without requiring to make the user manually set authentication information or perform complicated operation. This makes it possible to easily provide a high-security wireless communication system and service.

In the embodiment, a printer and digital still camera have been described as a host and device, respectively. However, the present invention is not limited by these apparatuses. That is, it suffices if a host and device each can perform RF power control and measurement of a reception power and include a single communication means for communication with a remote apparatus (although devices 3 and 4 (a cellular-telephone and PDA) shown in FIG. 4 each have two communication means, it should be noted that only one means is used to communicate with the host).

It therefore suffices if, for example, the host is an information processing apparatus (host) such as a desk-top personal computer, and the other apparatus is a PDA or note-type personal computer.

Although the embodiment has been described on the assumption that at least one of a device and host apparatus can be moved, it suffices if the host apparatus and device each can perform RF power control and measurement of reception power. Assume therefore that the host apparatus and device each are provided with a circuit or software which performs RF power modulation processing equivalent in effect to the RF power control described with reference to FIGS. 7A to 8B in the embodiment. In this case, even if one of the apparatuses does not move, RF power modulation processing is performed by operating a button or key provided on the apparatus and authentication processing can be performed by a method conforming to the embodiment as long as both the apparatuses are located within the authentication zones of the respective apparatuses.

Obviously, if a general-purpose information processing apparatus such a personal computer functions as a host or device, a program for performing the processing shown in FIGS. 10A and 10B or FIG. 13 is installed. It is natural that the present invention incorporates such a computer program. Furthermore, in general, a computer program can be executed by storing the program in a computer-readable storage medium such as a CD-ROM, setting it in a computer, and copying or installing it in a system. It is therefore obvious that such a computer-readable storage medium falls within the range of the present invention.

As has been described above, the present invention can simplify operation to be performed by an operator and perform authentication processing between two apparatuses while allowing each apparatus to use a single wireless communication means.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Applications No. 2004-314723 filed on Oct. 28, 2004, the entire contents of which are hereby incorporated by reference herein.

The invention claimed is:

1. A wireless communication apparatus which has a wireless communication unit constructed to communicate with a mobile wireless communication device and to execute predetermined processing on the basis of received information, comprising:
    an instructing unit constructed to instruct start of authentication processing in order to start communicating with a wireless communication device;
    a transmission unit constructed to transmit a search signal containing verification data by the wireless communication unit when a start of authentication is instructed by said instructing unit; and
    an authentication unit constructed to transmit authentication information to the wireless communication device, when a response signal is received by the wireless communication unit from one wireless communication device after the search signal is transmitted by said transmission unit and when the verification data is contained in the response signal.

2. A wireless communication apparatus which has a wireless communication unit constructed to communicate with a mobile wireless communication device and to execute predetermined processing on the basis of received information, comprising:
    an instructing unit constructed to instruct start of authentication processing in order to start communicating with a wireless communication device;
    a transmission unit constructed to transmit a search signal containing response time interval data by the wireless communication unit when a start of authentication is instructed by said instructing unit; and
    an authentication unit constructed to transmit authentication information to the wireless communication device, when plural response signals are received by the wireless communication unit from one wireless communication device at response time intervals indicated by the response time interval data after the search signal is transmitted by said transmission unit.

3. A wireless communication apparatus which has a wireless communication unit constructed to communicate with a mobile wireless communication device and to execute predetermined processing on the basis of received information, comprising:
    a detection unit constructed to detect an intensity of a signal received by the wireless communication unit;
    an instructing unit constructed to instruct start of authentication processing in order to start communicating with a wireless communication device;
    a transmission unit constructed to transmit a predetermined search signal by using the wireless communication unit when a start of authentication is instructed by said instructing unit; and
    an authentication unit constructed to transmit authentication information to the wireless communication device, when plural response signals are received by the wireless communication unit from one wireless communication device after the search signal is transmitted by said transmission unit and when an absolute value of a reception intensity difference between the response signals is larger than a predetermined threshold T1 and less than a predetermined threshold T2(T2>T1>0).

4. A wireless communication apparatus which has a wireless communication unit constructed to communicate with a mobile wireless communication device and to execute predetermined processing on the basis of received information, comprising:
an instructing unit constructed to instruct start of authentication processing in order to start communicating with a wireless communication device;
a setting unit constructed to set an authentication area narrower than a communicative area after authentication with respect to the wireless communication unit when a start of authentication is instructed by said instructing unit;
a transmission unit constructed to transmit a predetermined search signal by the wireless communication unit after the authentication area is set by said setting unit; and
an authentication unit constructed to transmit authentication information to the wireless communication device, when a response signal is received by the wireless communication unit from one wireless communication device after the search signal is transmitted from said transmitting unit.

5. A wireless communication apparatus constructed for communication with a mobile wireless communication device and for execution of predetermined processing, comprising:
a wireless communication unit constructed to switch a normal mode based on authentication information and an authentication mode of performing communication in an authentication area range narrower than an area range in the normal mode;
a detection unit constructed to detect an intensity of a signal received by the wireless communication unit;
an instructing unit constructed to instruct start of authentication processing in order to start communicating with a wireless communication device;
a transmission unit constructed to set the wireless communication unit in the authentication mode and to transmit a search signal containing verification data and response time interval data when a start of authentication is instructed by said instructing unit; and
an authentication unit constructed to transmit authentication information to the wireless communication device, when plural response signals containing the verification data are received by the wireless communication unit from one wireless communication device at response time intervals indicated by the response time interval data after the search signal is transmitted from said transmission unit and when an absolute value of a reception intensity difference between the response signals detected by said detection unit is larger than a predetermined threshold T1 and less than a predetermined threshold T2(T2>T1>0).

6. An electronic device including a wireless communication unit constructed to communicate with a predetermined wireless communication apparatus and to transmit information of a processing target, comprising:
an instructing unit constructed to instruct start of authentication processing in order to start communicating with a wireless communication apparatus;
a first reception unit constructed to receive a search signal by the wireless communication unit when a start of authentication is instructed by said instructing unit;
a transmission unit constructed to transmit plural response signals containing verification data contained in received search information through the wireless communication unit; and
a second reception unit constructed to receive authentication information through the wireless communication unit after transmission is performed by said transmission unit,
wherein when authentication information is received by said second reception unit, communication is subsequently performed with the wireless communication apparatus on the basis of the authentication information.

7. An electronic device including a wireless communication unit constructed to communicate with a predetermined wireless communication apparatus and to transmit information of a processing target, comprising:
an instructing unit constructed to instruct start of authentication processing in order to start communicating with a wireless communication device;
a setting unit constructed to set an authentication area narrower than a communicative area after authentication with respect to the wireless communication unit when a start of authentication is instructed by said instructing unit;
a first reception unit constructed to receive a predetermined search signal by the wireless communication unit after the authentication area is set by said setting unit;
a transmission unit constructed to transmit plural response signals through the wireless communication unit in accordance with reception by said first reception unit; and
a second reception unit constructed to receive authentication information through the wireless communication unit after transmission by said transmission unit,
wherein when authentication information is received by said second reception unit, communication is subsequently performed with the wireless communication apparatus on the basis of the authentication information.

8. An electronic device including a wireless communication unit constructed to communicate with a predetermined wireless communication apparatus and to transmit information of a processing target, comprising:
an instructing unit constructed to instruct start of authentication processing in order to start communicating with a wireless communication device;
a setting unit constructed to set an authentication area narrower than a communicative area after authentication with respect to the wireless communication unit when a start of authentication is instructed by said instructing unit;
a first reception unit constructed to receive a predetermined search signal by the wireless communication unit after the authentication area is set by said setting unit;
a transmission unit constructed to transmit plural response signals containing verification data contained in received search information through the wireless communication unit at time intervals based on time interval instruction information contained in the search information; and
a second reception unit constructed to receive authentication information through the wireless communication unit after transmission by said transmission unit,
wherein when authentication information is received by said second reception unit, communication is subsequently performed with the wireless communication apparatus on the basis of the authentication information.

9. A control method for a wireless communication apparatus which has a wireless communication unit constructed to communicate with a mobile wireless communication device and to execute predetermined processing on the basis of received information, comprising:
- an instructing step of instructing to start authentication processing in order to start communicating with a wireless communication device;
- a transmission step of transmitting a search signal containing verification data by the wireless communication unit when a start of authentication is instructed in the instructing step; and
- an authentication step of transmitting authentication information to the wireless communication device, when a response signal is received by the wireless communication unit from one wireless communication device after the search signal is transmitted in the transmission step and when the verification data is contained in the response signal.

10. A control method for a wireless communication apparatus which has a wireless communication unit constructed to communicate with a mobile wireless communication device and to execute predetermined processing on the basis of received information, comprising:
- an instructing step of instructing to start authentication processing in order to start communicating with a wireless communication device;
- a transmission step of transmitting a search signal containing response time interval data by the wireless communication unit when a start of authentication is instructed in the instructing step; and
- an authentication step of transmitting authentication information to the wireless communication device, when plural response signals are received by the wireless communication unit from one wireless communication device at response time intervals indicated by the response time interval data after the search signal is transmitted in the transmission step.

11. A control method for a wireless communication apparatus which has a wireless communication unit constructed to communicate with a mobile wireless communication device and to execute predetermined processing on the basis of received information, comprising:
- a detection step of detecting an intensity of a signal received by the wireless communication unit;
- an instructing step of instructing to start authentication processing in order to start communicating with a wireless communication device;
- a transmission step of transmitting a predetermined search signal by using the wireless communication unit when a start of authentication is instructed in the instructing step; and
- an authentication step of transmitting authentication information to the wireless communication device, when plural response signals are received by the wireless communication unit from one wireless communication device after the search signal is transmitted in the transmission step and when an absolute value of a reception intensity difference between the response signals is larger than a predetermined threshold T1 and less than a predetermined threshold $T2(T2>T1>0)$.

12. A control method for a wireless communication apparatus which has a wireless communication unit constructed to communicate with a mobile wireless communication device and to execute predetermined processing on the basis of received information, comprising:
- an instructing step of instructing to start authentication processing in order to start communicating with a wireless communication device;
- a setting step of setting an authentication area narrower than a communicative area after authentication with respect to the wireless communication unit when a start of authentication is instructed in the instructing step;
- a transmission step of transmitting a predetermined search signal by the wireless communication unit after the authentication area is set in the setting step; and
- an authentication step of transmitting authentication information to the wireless communication device, when a response signal is received by the wireless communication unit from one wireless communication device after the search signal is transmitted in the transmitting step.

13. A control method for a wireless communication apparatus constructed for communication with a mobile wireless communication device and for execution of predetermined processing, comprising:
- a wireless communication switching step of switching a predetermined wireless communication unit between a normal mode based on authentication information and an authentication mode of performing communication in an authentication area range narrower than an area range in the normal mode;
- a detection step of detecting an intensity of a signal received by the wireless communication unit;
- an instructing step of instructing to start authentication processing in order to start communicating with a wireless communication device;
- a transmission step of setting the wireless communication unit in the authentication mode and transmitting a search signal containing verification data and response time interval data when a start of authentication is instructed in the instructing step; and
- an authentication step of transmitting authentication information to the wireless communication device, when plural response signals containing the verification data are received by the wireless communication unit from one wireless communication device at response time intervals indicated by the response time interval data after the search signal is transmitted in the transmission step and when an absolute value of a reception intensity difference between the response signals detected in the detection step is larger than a predetermined threshold T1 and less than a predetermined threshold $T2(T2>T1>0)$.

14. A control method for an electronic device including a wireless communication unit constructed to communicate with a predetermined wireless communication apparatus and to transmit information of a processing target, comprising:
- an instructing step of instructing to start authentication processing in order to start communicating with a wireless communication apparatus;
- a first reception step of receiving a search signal by the wireless communication unit when a start of authentication is instructed in the instructing step;
- a transmission step of transmitting plural response signals containing verification data contained in received search information through the wireless communication unit; and
- a second reception step of receiving authentication information through the wireless communication unit after transmission is performed in the transmission step,
- wherein when authentication information is received in the second reception step, communication is subsequently performed with the wireless communication apparatus on the basis of the authentication information.

15. A control method for an electronic device including a wireless communication unit constructed to communicate with a predetermined wireless communication apparatus and to transmit information of a processing target, comprising:
- an instructing step of instructing to start authentication processing in order to start communicating with a wireless communication apparatus;
- a setting step of setting an authentication area narrower than a communicative area after authentication with respect to the wireless communication unit when a start of authentication is instructed in the instructing step;
- a first reception step of receiving a predetermined search signal by the wireless communication unit after the authentication area is set in the setting step;
- a transmission step of transmitting plural response signals through the wireless communication unit in accordance with reception in the first reception step; and
- a second reception step of receiving authentication information through the wireless communication unit after transmission in the transmission step,
- wherein when authentication information is received in the second reception step, communication is subsequently performed with the wireless communication apparatus on the basis of the authentication information.

16. A control method for an electronic device including a wireless communication unit constructed to communicate with a predetermined wireless communication apparatus and to transmit information of a processing target, comprising:
- an instructing step of instructing to start authentication processing in order to start communicating with a wireless communication apparatus;
- a setting step of setting an authentication area narrower than a communicative area after authentication with respect to the wireless communication unit when a start of authentication is instructed in the instructing step;
- a first reception step of receiving a predetermined search signal by the wireless communication unit after the authentication area is set in the setting step;
- a transmission step of transmitting plural response signals, each containing verification data contained in received search information, through the wireless communication unit at time intervals based on time interval instruction information contained in the search information; and
- a second reception step of receiving authentication information through the wireless communication unit after transmission in the transmission step,
- wherein when authentication information is received in the second reception step, communication is subsequently performed with the wireless communication apparatus on the basis of the authentication information.

17. A non-transitory computer-readable storage medium on which is retrievably stored a computer-executable program for a wireless communication apparatus constructed for communication with a mobile wireless communication device and for execution of predetermined processing, wherein said computer-executable program causes the wireless communication apparatus to perform steps comprising:
- a detection step of detecting an intensity of a signal received by the wireless communication unit;
- an instructing step of instructing to start authentication processing in order to start communicating with a wireless communication device;
- a transmission step of transmitting a predetermined search signal by using the wireless communication unit when a start of authentication is instructed in the instructing step; and
- an authentication step of transmitting authentication information to the wireless communication device, when plural response signals are received by the wireless communication unit from one wireless communication device after the search signal is transmitted in the transmission step and when an absolute value of a reception intensity difference between the response signals is larger than a predetermined threshold T1 and less than a predetermined threshold T2(T2>T1>0).

18. A non-transitory computer-readable storage medium on which is retrievably stored a computer-executable program for an electronic device including a wireless communication unit constructed to communicate with a predetermined wireless communication apparatus and to transmit information of a processing target, wherein said computer-executable program causes the electronic device to perform steps comprising:
- an instructing step of instructing to start authentication processing in order to start communicating with a wireless communication apparatus;
- a first reception step of receiving a search signal by the wireless communication unit when a start of authentication is instructed in the instructing step;
- a transmission step of transmitting plural response signals containing verification data contained in received search information through the wireless communication unit; and
- a second reception step of receiving authentication information through the wireless communication unit after transmission is performed in the transmission step,
- wherein when authentication information is received in the second reception step, communication is subsequently performed with the wireless communication apparatus on the basis of the authentication information.

* * * * *